United States Patent
Huang

(10) Patent No.: US 10,602,498 B2
(45) Date of Patent: Mar. 24, 2020

(54) METHOD AND APPARATUS FOR SIGNALING DIFFERENT SHORT TTI (TRANSMISSION TIME INTERVAL) BAND IN SHORTENED TTI IN A WIRELESS COMMUNICATION SYSTEM

(71) Applicant: ASUSTek Computer Inc., Taipei (TW)

(72) Inventor: Chun-Wei Huang, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 169 days.

(21) Appl. No.: 15/796,007

(22) Filed: Oct. 27, 2017

(65) Prior Publication Data

US 2018/0132211 A1 May 10, 2018

Related U.S. Application Data

(60) Provisional application No. 62/417,665, filed on Nov. 4, 2016, provisional application No. 62/420,200, filed on Nov. 10, 2016.

(51) Int. Cl.
*H04W 72/04* (2009.01)
*H04W 72/12* (2009.01)
*H04L 5/00* (2006.01)

(52) U.S. Cl.
CPC ......... *H04W 72/042* (2013.01); *H04L 5/0053* (2013.01); *H04L 5/0094* (2013.01); *H04W 72/0446* (2013.01); *H04W 72/1289* (2013.01); *H04W 72/1257* (2013.01)

(58) Field of Classification Search
CPC ............................ H04L 5/00; H04W 72/0446; H04W 72/1289; H04W 72/042
See application file for complete search history.

(56) References Cited

U.S. PATENT DOCUMENTS

| | | | |
|---|---|---|---|
| 10,172,130 B2* | 1/2019 | Chen | H04W 72/0446 |
| 10,397,912 B2* | 8/2019 | Byun | H04B 7/26 |
| 2014/0016573 A1 | 1/2014 | Nuggehalli et al. | |
| 2016/0249250 A1* | 8/2016 | Kim | H04L 1/0014 |
| 2016/0330766 A1 | 11/2016 | Liu et al. | |
| 2017/0013618 A1* | 1/2017 | Shin | H04W 72/0446 |
| 2017/0099127 A1 | 4/2017 | Byun et al. | |
| 2017/0134129 A1 | 5/2017 | You et al. | |
| 2017/0171842 A1 | 6/2017 | You et al. | |
| 2017/0332397 A1* | 11/2017 | Li | H04L 1/1887 |
| 2018/0027595 A1* | 1/2018 | Wang | H04L 12/413 370/329 |
| 2018/0035430 A1* | 2/2018 | Futaki | H04L 5/0044 |

(Continued)

FOREIGN PATENT DOCUMENTS

| | | |
|---|---|---|
| WO | 2013174167 | 11/2013 |
| WO | 2016127392 | 8/2016 |
| WO | 2016142862 | 9/2016 |

*Primary Examiner* — Chi H Pham
*Assistant Examiner* — Weibin Huang
(74) *Attorney, Agent, or Firm* — Blue Capital Law Firm, P.C.

(57) ABSTRACT

A method and apparatus are disclosed from the perspective of a first UE. In one embodiment, the method includes a first UE configured with TTI(s) shorter than one subframe; wherein there are X TTIs in one subframe. The method further includes the first UE receiving a downlink control information which indicates resource allocation for first resources and second resources; wherein there are X TTIs in the first resources.

20 Claims, 19 Drawing Sheets

(56) References Cited

U.S. PATENT DOCUMENTS

2018/0359745 A1* 12/2018 Yeo .......................... H04L 1/18
2019/0036758 A1* 1/2019 Takeda ..................... H04L 5/14
2019/0124633 A1* 4/2019 Hang ................... H04W 72/04

* cited by examiner

| System Bandwidth $N_{RB}^{DL}$ | RBG Size ($P$) |
|---|---|
| ≤10 | 1 |
| 11 – 26 | 2 |
| 27 – 63 | 3 |
| 64 – 110 | 4 |

FIG. 5 (PRIOR ART)

| System Bandwidth ($N_{RB}^{DL}$) | PRG Size ($P'$) (PRBs) |
|---|---|
| ≤10 | 1 |
| 11 – 26 | 2 |
| 27 – 63 | 3 |
| 64 – 110 | 2 |

FIG. 6 (PRIOR ART)

| Type | Search space $S_k^{(L)}$ | | Number of PDCCH candidates $M^{(L)}$ |
|---|---|---|---|
| | Aggregation level $L$ | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

FIG. 7 (PRIOR ART)

| CFI | CFI code word<br>$< b_0, b_1, ..., b_{31} >$ |
|---|---|
| 1 | <0,1,1,0,1,1,0,1,1,0,1,1,0,1,1,0,1,1,0,1,1,0,1,1,0,1,1,0,1,1,0,1> |
| 2 | <1,0,1,1,0,1,1,0,1,1,0,1,1,0,1,1,0,1,1,0,1,1,0,1,1,0,1,1,0,1,1,0> |
| 3 | <1,1,0,1,1,0,1,1,0,1,1,0,1,1,0,1,1,0,1,1,0,1,1,0,1,1,0,1,1,0,1,1> |
| 4 (Reserved) | <0,0,0,0,0,0,0,0,0,0,0,0,0,0,0,0,0,0,0,0,0,0,0,0,0,0,0,0,0,0,0,0> |

FIG. 10 (PRIOR ART)

| Subframe | Number of OFDM symbols for PDCCH when $N_{RB}^{DL} > 10$ | Number of OFDM symbols for PDCCH when $N_{RB}^{DL} \leq 10$ |
|---|---|---|
| Subframe 1 and 6 for frame structure type 2 | 1, 2 | 2 |
| MBSFN subframes on a carrier supporting PDSCH, configured with 1 or 2 cell-specific antenna ports | 1, 2 | 2 |
| MBSFN subframes on a carrier supporting PDSCH, configured with 4 cell-specific antenna ports | 2 | 2 |
| Subframes on a carrier not supporting PDSCH | 0 | 0 |
| Non-MBSFN subframes (except subframe 6 for frame structure type 2) configured with positioning reference signals | 1, 2, 3 | 2, 3 |
| All other cases | 1, 2, 3 | 2, 3, 4 |

FIG. 11 (PRIOR ART)

| Physical channel | Modulation schemes |
|---|---|
| PCFICH | QPSK |

FIG. 12 (PRIOR ART)

| PDCCH format | Number of CCEs | Number of resource-element groups | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

FIG. 13 (PRIOR ART)

| Physical channel | Modulation schemes |
|---|---|
| PDCCH | QPSK |

FIG. 14 (PRIOR ART)

| | Overhead of DL DMRS per TTI | |
|---|---|---|
| | 1 or 2 ports | 4 or 8 ports |
| 14 symbol TTI | 7.14% | 14.29% |
| 7 symbol TTI | 7.14% | 14.29% |
| 2 symbol TTI | 25% | 50% |

FIG. 15 (PRIOR ART)

| Subframe | Number of OFDM symbols for PDCCH when $N_{RB}^{DL} > 10$ | Number of OFDM symbols for PDCCH when $N_{RB}^{DL} \leq 10$ |
|---|---|---|
| Subframe 1 and 6 for frame structure type 2 | 1, 2 | 2 |
| MBSFN subframes on a carrier supporting PDSCH, configured with 1 or 2 cell-specific antenna ports | 1, 2 | 2 |
| MBSFN subframes on a carrier supporting PDSCH, configured with 4 cell-specific antenna ports | 2 | 2 |
| Subframes on a carrier not supporting PDSCH | 0 | 0 |
| Non-MBSFN subframes (except subframe 6 for frame structure type 2) configured with positioning reference signals | 1, 2, 3 | 2, 3 |
| All other cases | 1, 2, 3 | 2, 3, 4 |

FIG. 16 (PRIOR ART)

| Physical channel | Modulation schemes |
|---|---|
| PCFICH | QPSK |

FIG. 17 (PRIOR ART)

METHOD AND APPARATUS FOR SIGNALING DIFFERENT SHORT TTI (TRANSMISSION TIME INTERVAL) BAND IN SHORTENED TTI IN A WIRELESS COMMUNICATION SYSTEM

CROSS-REFERENCE TO RELATED APPLICATIONS

The present Application claims the benefit of U.S. Provisional Patent Application Ser. No. 62/417,665 filed on Nov. 4, 2016 and U.S. Provisional Patent Application Ser. No. 62/420,200 filed on Nov. 10, 2016, the entire disclosures of which are incorporated herein in their entirety by reference.

FIELD

This disclosure generally relates to wireless communication networks, and more particularly, to a method and apparatus for signaling different short TTI band in shortened TTI in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a first UE (User Equipment). In one embodiment, the method includes a first UE configured with TTI(s) shorter than one subframe; wherein there are X TTIs in one subframe. The method further includes the first UE receiving a downlink control information which indicates resource allocation for first resources and second resources; wherein there are X TTIs in the first resources.

BRIEF DESCRIPTION OF THE DRAWINGS

FIG. 5 is a reproduction of Table 7.1.6.1-1 of 3GPP TS 36.213 V10.13.0.

FIG. 6 is a reproduction of Table 7.1.6.5-1 of 3GPP TS 36.213 V10.13.0.

FIG. 7 is a reproduction of Table 9.1.1-1 of 3GPP TS 36.213 V10.13.0.

FIG. 10 is a reproduction of Table 5.3.4-1 of 3GPP TS 36.212 V10.9.0.

FIG. 11 is a reproduction of Table 6.7-1 of 3GPP TS 36.211 V10.7.0.

FIG. 12 is a reproduction of Table 6.7.2-1 of 3GPP TS 36.211 V10.7.0.

FIG. 13 is a reproduction of Table 6.8.1-1 of 3GPP TS 36.211 V10.7.0.

FIG. 14 is a reproduction of Table 6.8.3-1 of 3GPP TS 36.211 V10.7.0.

FIG. 15 is a reproduction of Table 1 of R1-1609823.

FIG. 16 is a reproduction of Table 6.7-1 of 3GPP TS 36.211 V10.7.0.

FIG. 17 is a reproduction of Table 6.7.2-1 of 3GPP TS 36.211 V10.7.0.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including: TS 36.213 V10.13.0, "E-UTRA; Physical layer procedures (Release 10)"; R1-1608633, "Discussion on DMRS-based sPDCCH", Huawei and HiSilicon; R1-1608915, "Discussion on DL RS design for sTTI", Spreadtrum Communications;

R1-1609823, "DL DMRS and DCI design for short TTI", MediaTek; TS 36.211 V10.7.0, "E-UTRA; Physical Channels and Modulation (Release 10)"; TR 38.881 V14.0.0, "E-UTRA; Study on latency reduction techniques for LTE; (Release 14)"; RAN 1#85 Chairman's Notes; RAN 1#86 Chairman's Notes; TS 36.212 V10.9.0, "E-UTRA; Multiplexing and channel coding (Release 10)"; and TS 36.331, "E-UTRA; Radio Resource Control (RRC); Protocol specification (Release 8)". The standards and documents listed above are hereby expressly incorporated by reference in their entirety.

Figure 1:
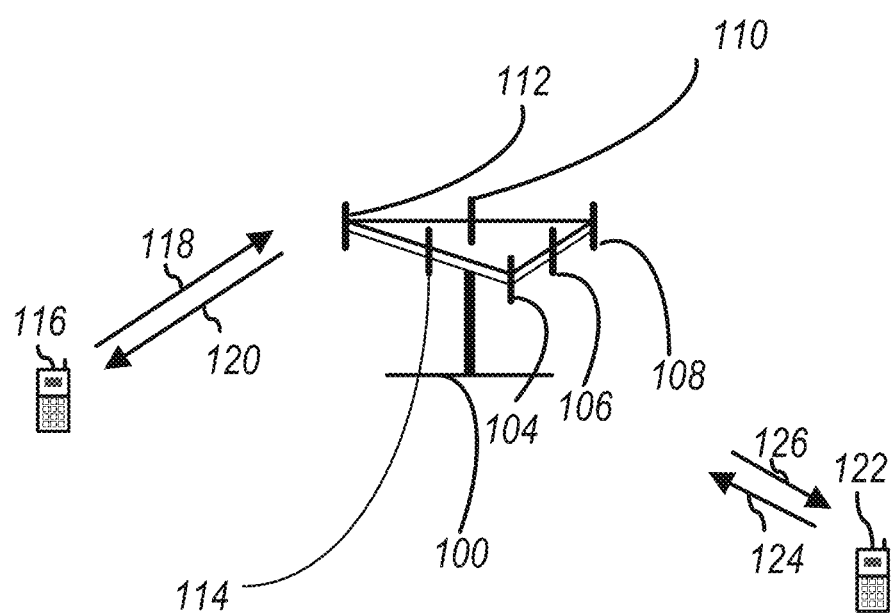
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
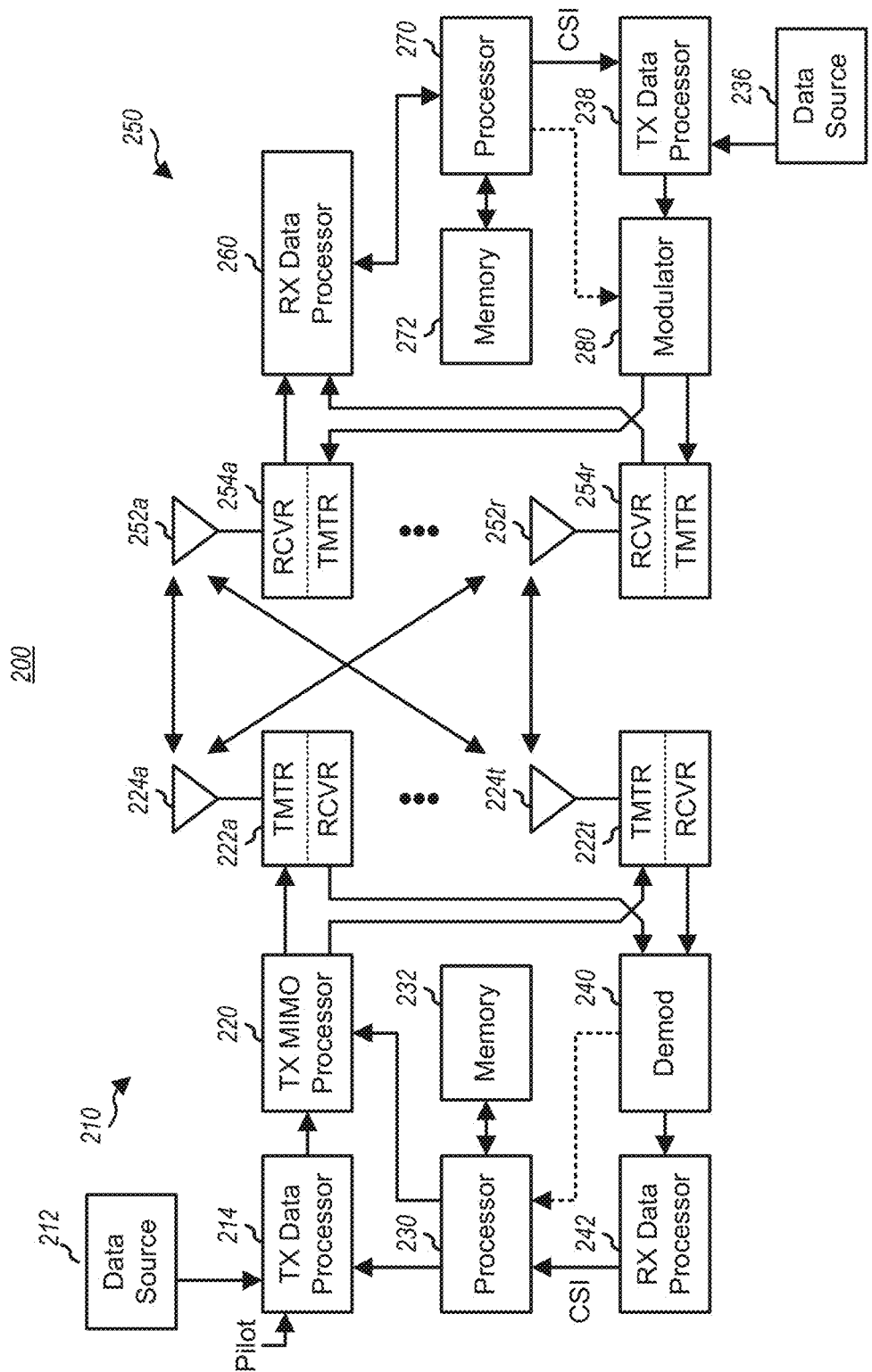
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
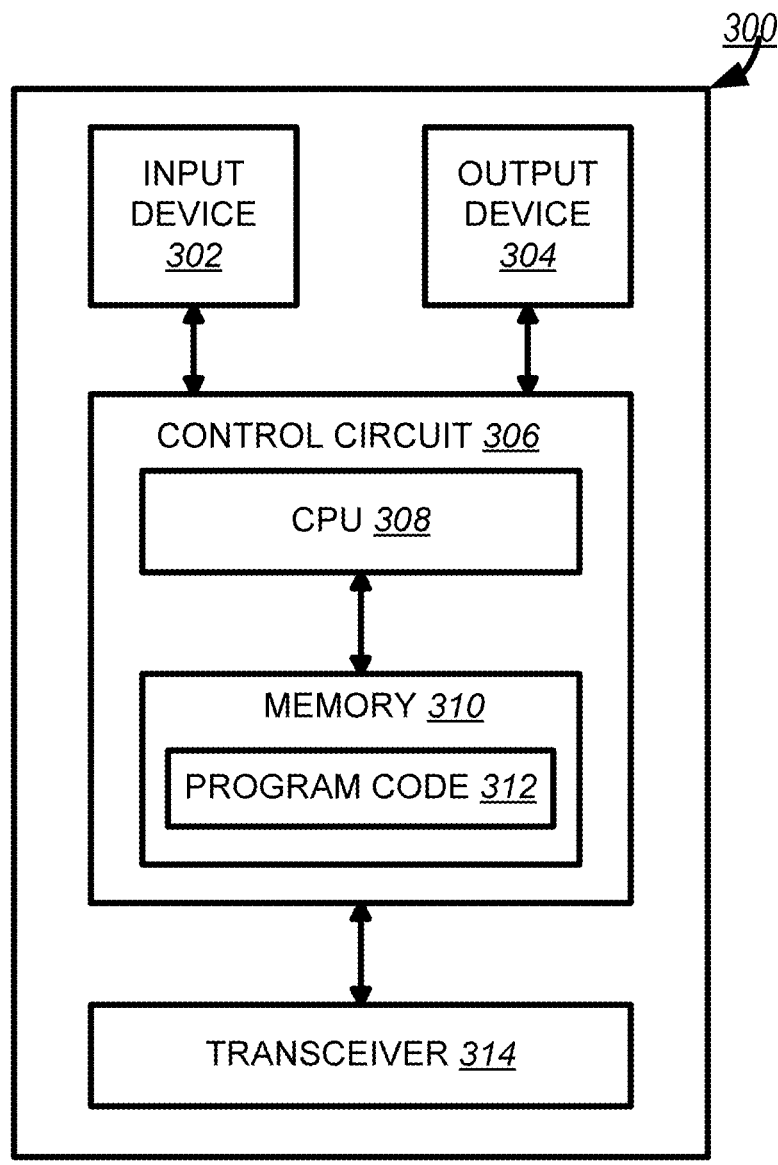
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
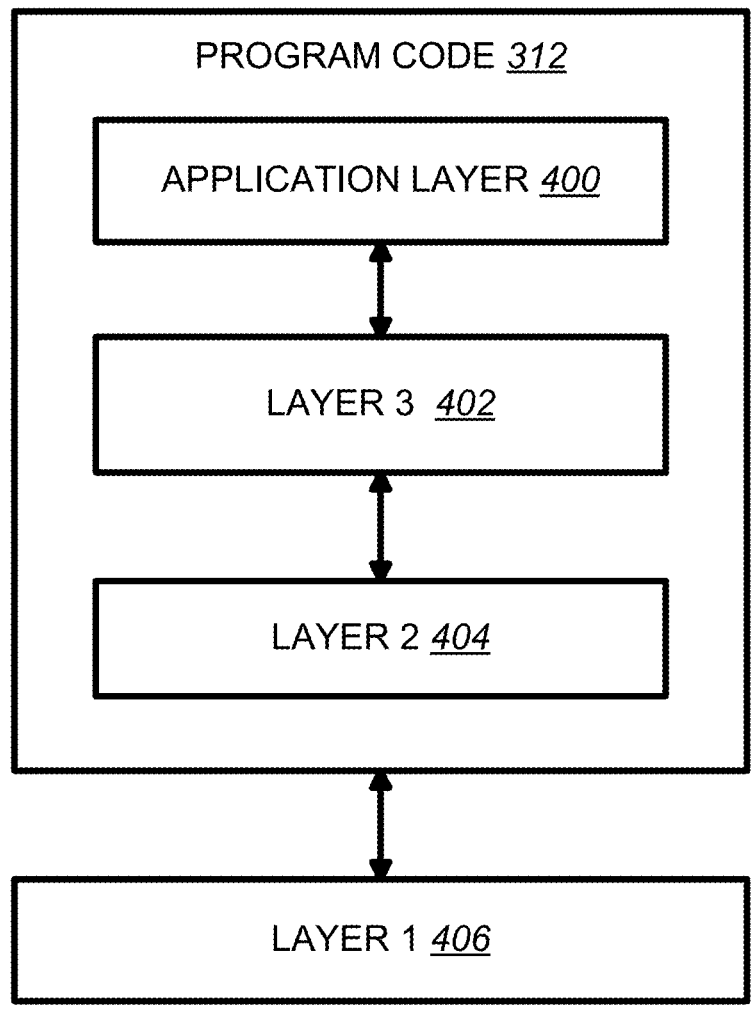
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

In general, the objective of the present invention is to study the shortening TTI used in latency reduction for beyond 4G, to accommodate requirements discussed in 3GPP TR 38.881. An important focus of this study is indicating resource allocation of different TTI length in low CCE cost way.

3GPP TS 36.213 V10.13.0 provides the following resource allocation type related description:
7 Physical Downlink Shared Channel Related Procedures
[ . . . ]
7.1.6 Resource Allocation The UE shall interpret the resource allocation field depending on the PDCCH DCI format detected. A resource allocation field in each PDCCH includes two parts, a resource allocation header field and information consisting of the actual resource block assignment. PDCCH DCI formats 1, 2, 2A, 2B and 2C with type 0 and PDCCH DCI formats 1, 2, 2A, 2B and 2C with type 1 resource allocation have the same format and are distinguished from each other via the single bit resource allocation header field which exists depending on the downlink system bandwidth (subclause 5.3.3.1 of [4]), where type 0 is indicated by 0 value and type 1 is indicated otherwise. PDCCH with DCI format 1A, 1B, 1C and 1D have a type 2 resource allocation while PDCCH with DCI format 1, 2, 2A, 2B and 2C have type 0 or type 1 resource allocation. PDCCH DCI formats with a type 2 resource allocation do not have a resource allocation header field.

7.1.6.1 Resource Allocation Type 0

In resource allocations of type 0, resource block assignment information includes a bitmap indicating the resource block groups (RBGs) that are allocated to the scheduled UE where a RBG is a set of consecutive virtual resource blocks (VRBs) of localized type as defined in subclause 6.2.3.1 of [3]. Resource block group size (P) is a function of the system bandwidth as shown in Table 7.1.6.1-1. The total number of RBGs ($N_{RBG}$) for downlink system bandwidth of $N_{RB}^{DL}$ is given by $N_{RBG}=\lceil N_{RB}^{DL}/P \rceil$ where $\lfloor N_{RB}^{DL}/P \rfloor$ of the RBGs are of size P and if $N_{RB}^{DL} \mod P>0$ then one of the RBGs is of size $N_{RB}^{DL}-P \cdot \lfloor N_{RB}^{DL}/P \rfloor$. The bitmap is of size $N_{RBG}$ bits with one bitmap bit per RBG such that each RBG is addressable. The RBGs shall be indexed in the order of increasing frequency and non-increasing RBG sizes starting at the lowest frequency. The order of RBG to bitmap bit mapping is in such way that RBG 0 to RBG $N_{RBG}-1$ are mapped to MSB to LSB of the bitmap. The RBG is allocated to the UE if the corresponding bit value in the bitmap is 1, the RBG is not allocated to the UE otherwise.

Table 7.1.6.1-1 of 3GPP TS 36.213 V10.13.0,
Entitled "Type 0 Resource Allocation RBG Size vs.
Downlink System Bandwidth", is Reproduced as
FIG. 5

7.1.6.2 Resource Allocation Type 1

In resource allocations of type 1, a resource block assignment information of size $N_{RBG}$ indicates to a scheduled UE the VRBs from the set of VRBs from one of P RBG subsets. The virtual resource blocks used are of localized type as defined in subclause 6.2.3.1 of [3]. Also P is the RBG size associated with the system bandwidth as shown in Table 7.1.6.1-1. A RBG subset p, where 0≤p<P, consists of every P th RBG starting from RBG p. The resource block assignment information consists of three fields [4].

The first field with $\lceil \log_2(P) \rceil$ bits is used to indicate the selected RBG subset among P RBG subsets.

The second field with one bit is used to indicate a shift of the resource allocation span within a subset. A bit value of 1 indicates shift is triggered. Shift is not triggered otherwise.

The third field includes a bitmap, where each bit of the bitmap addresses a single VRB in the selected RBG subset in such a way that MSB to LSB of the bitmap are mapped to the VRBs in the increasing frequency order. The VRB is allocated to the UE if the corresponding bit value in the bit field is 1, the VRB is not allocated to the UE otherwise. The portion of the bitmap used to address VRBs in a selected RBG subset has size $N_{RB}^{TYPE1}$ and is defined as $$N_{RB}^{TYPE1}=\lceil N_{RB}^{DL}/P \rceil - \lceil \log_2(P) \rceil - 1$$

The addressable VRB numbers of a selected RBG subset start from an offset, $\Delta_{shift}(p)$ to the smallest VRB number within the selected RBG subset, which is mapped to the MSB of the bitmap. The offset is in terms of the number of VRBs and is done within the selected RBG subset. If the value of the bit in the second field for shift of the resource allocation span is set to 0, the offset for RBG subset p is given by $\Delta_{shift}(p)=0$. Otherwise, the offset for RBG subset p is given by $\Delta_{shift}(p)=N_{RB}^{RBGsubset}(p)-N_{RB}^{TYPE1}$, where the LSB of the bitmap is justified with the highest VRB number within the selected RBG subset. $N_{RB}^{RBGsubset}(p)$ is the number of VRBs in RBG subset p and can be calculated by the following equation, $$N_{RB}^{RBG\ subset}(p) = \begin{cases} \left\lfloor \frac{N_{RB}^{DL}-1}{P^2} \right\rfloor \cdot P + P, & p < \left\lfloor \frac{N_{RB}^{DL}-1}{P} \right\rfloor \mod P \\ \left\lfloor \frac{N_{RB}^{DL}-1}{P^2} \right\rfloor \cdot P + (N_{RB}^{DL}-1)\mod P + 1, & p = \left\lfloor \frac{N_{RB}^{DL}-1}{P} \right\rfloor \mod P \\ \left\lfloor \frac{N_{RB}^{DL}-1}{P^2} \right\rfloor \cdot P, & p > \left\lfloor \frac{N_{RB}^{DL}-1}{P} \right\rfloor \mod P \end{cases}$$

Consequently, when RBG subset p is indicated, bit i for i=0,1, . . . ,$N_{RB}^{TYPE1}$-1 in the bitmap field indicates VRB number, $$n_{VRB}^{RBG\ subset}(p) = \left\lfloor \frac{i+\Delta_{shift}(p)}{P} \right\rfloor P^2 + p \cdot P + (i+\Delta_{shift}(p)) \bmod P.$$

7.1.6.3 Resource Allocation Type 2

In resource allocations of type 2, the resource block assignment information indicates to a scheduled UE a set of contiguously allocated localized virtual resource blocks or distributed virtual resource blocks. In case of resource allocation signalled with PDCCH DCI format 1A, 1B or 1D, one bit flag indicates whether localized virtual resource blocks or distributed virtual resource blocks are assigned (value 0 indicates Localized and value 1 indicates Distributed VRB assignment) while distributed virtual resource blocks are always assigned in case of resource allocation signalled with PDCCH DCI format 1C. Localized VRB allocations for a UE vary from a single VRB up to a maximum number of VRBs spanning the system bandwidth. For DCI format 1A the distributed VRB allocations for a UE vary from a single VRB up to $N_{VRB}^{DL}$ VRBs, where $N_{VRB}^{DL}$ is defined in [3], if the DCI CRC is scrambled by P-RNTI, RA-RNTI, or SI-RNTI. With PDCCH DCI format 1B, 1D with a CRC scrambled by C-RNTI, or with DCI format 1A with a CRC scrambled with C-RNTI, SPS C-RNTI or Temporary C-RNTI distributed VRB allocations for a UE vary from a single VRB up to $N_{VRB}^{DL}$ VRBs if $N_{RB}^{DL}$ is 6-49 and vary from a single VRB up to 16 if $N_{RB}^{DL}$ is 50-110. With PDCCH DCI format 1C, distributed VRB allocations for a UE vary from $N_{RB}^{step}$ VRB(s) up to $\lfloor N_{VRB}^{DL}/N_{RB}^{step} \rfloor \cdot N_{RB}^{step}$ VRBs with an increment step of $N_{RB}^{step}$, where $N_{RB}^{step}$ value is determined depending on the downlink system bandwidth as shown in Table 7.1.6.3-1.

[ . . . ]

For PDCCH DCI format 1A, 1B or 1D, a type 2 resource allocation field consists of a resource indication value (RIV) corresponding to a starting resource block ($RB_{start}$) and a length in terms of virtually contiguously allocated resource blocks $L_{CRBs}$. The resource indication value is defined by if $(L_{CRBs}-1) \le \lfloor N_{RB}^{DL}/2 \rfloor$ then $RIV = N_{RB}^{DL}(L_{CRBs}-1) + RB_{start}$ else $RIV = N_{RB}^{DL}(N_{RB}^{DL}-L_{CRBs}+1) + (N_{RB}^{DL}-1-RB_{start})$ where $L_{CRBs} \ge 1$ and shall not exceed $N_{VRB}^{DL}-RB_{start}$.

For PDCCH DCI format 1C, a type 2 resource block assignment field consists of a resource indication value (RIV) corresponding to a starting resource block ($RB_{start}=0$, $N_{RB}^{step}$, $2N_{RB}^{step}$, . . . , $(\lfloor N_{VRB}^{DL}/N_{RB}^{step} \rfloor -1)N_{RB}^{step}$) and a length in terms of virtually contiguously allocated resource blocks ($L_{CRBs}=N_{RB}^{step}$, $2N_{RB}^{step}$, . . . , $\lfloor N_{VRB}^{DL}/N_{RB}^{step} \rfloor \cdot N_{RB}^{step}$). The resource indication value is defined by if $(L'_{CRBs}-1) \le \lfloor N'_{VRB}^{DL}/2 \rfloor$ then $RIV = N'_{VRB}^{DL}(L'_{CRBs}-1) + RB'_{start}$ else $RIV = N'_{VRB}^{DL}(N'_{VRB}^{DL}-L'_{CRBs}+1) + (N'_{VRB}^{DL}-1RB'_{start})$ where $L'_{CRBs}=L_{CRBs}/N_{RB}^{step}$, $RB'_{start}=RB_{start}/N_{RB}^{step}$ and $N'_{VRB}^{DL}=\lfloor N_{VRB}^{DL}/N_{RB}^{step} \rfloor$. Here, $L'_{CRBs} \ge 1$ and shall not exceed $N'_{VRB}^{DL}-RB'_{start}$.

7.1.6.4 PDSCH Starting Position

The starting OFDM symbol for the PDSCH of each activated serving cell given by index $l_{DataStart}$ in the first slot in a subframe is given by the higher-layer parameter pdsch-Start for the serving cell on which PDSCH is received if the UE is configured with carrier indicator field for the given serving cell and if PDSCH and the corresponding PDCCH are received on different serving cells, the span of the DCI given by the CFI of the serving cell according to subclause 5.3.4 of [4] otherwise.

7.1.6.5 PRB Bundling

A UE configured for transmission mode 9 for a given serving cell c may assume that precoding granularity is multiple resource blocks in the frequency domain when PMI/RI reporting is configured. Fixed system bandwidth dependent Precoding Resource block Groups (PRGs) of size P' partition the system bandwidth and each PRG consists of consecutive PRBs. If $N_{RB}^{DL}$ mod P'>0 then one of the PRGs is of size $N_{RB}^{DL}-P'\lfloor N_{RB}^{DL}/P' \rfloor$. The PRG size is non-increasing starting at the lowest frequency. The UE may assume that the same precoder applies on all scheduled PRBs within a PRG.

The PRG size a UE may assume for a given system bandwidth is given by:

Table 7.1.6.5-1 of 3GPP TS 36.213 V10.13.0 is Reproduced as FIG. 6

8.1 Resource Allocation for PDCCH with Uplink DCI Format

Two resource allocation schemes Type 0 and Type 1 are supported for PDCCH with uplink DCI format.

If the resource allocation type bit is not present in the uplink DCI format, only resource allocation type 0 is supported.

If the resource allocation type bit is present in the uplink DCI format, the selected resource allocation type for a decoded PDCCH is indicated by a resource allocation type bit where type 0 is indicated by 0 value and type 1 is indicated otherwise. The UE shall interpret the resource allocation field depending on the resource allocation type bit in the uplink PDCCH DCI format detected.

8.1.1 Uplink Resource Allocation Type 0

The resource allocation information for uplink resource allocation type 0 indicates to a scheduled UE a set of contiguously allocated virtual resource block indices denoted by $n_{VRB}$. A resource allocation field in the scheduling grant consists of a resource indication value (RIV) corresponding to a starting resource block ($RB_{START}$) and a length in terms of contiguously allocated resource blocks ($L_{CRBs} \ge 1$). The resource indication value is defined by if $(L_{CRBs}-1) \le \lfloor N_{RB}^{UL}/2 \rfloor$ then $RIV = N_{RB}^{UL}(L_{CRBs}-1) + RB_{START}$ else $RIV = N_{RB}^{UL}(N_{RB}^{UL}-L_{CRBs}+1) + (N_{RB}^{UL}-1-RB_{START})$

8.1.2 Uplink Resource Allocation Type 1

The resource allocation information for uplink resource allocation type 1 indicates to a scheduled UE two sets of resource blocks with each set including one or more consecutive resource block groups of size P as given in table 7.1.6.1-1 assuming $N_{RB}^{UL}$ as the system bandwidth. A combinatorial index r consists of $$\left\lceil \log_2\left(\binom{\lceil N_{RB}^{UL}/P+1\rceil}{4}\right)\right\rceil$$

bits. The bits from the resource allocation field in the scheduling grant represent r unless the number of bits in the resource allocation field in the scheduling grant is
- smaller than required to fully represent r, in which case the bits in the resource allocation field in the scheduling grant occupy the LSBs of r and the value of the remaining bits of r shall be assumed to be 0; or
- larger than required to fully represent r, in which case r occupies the LSBs of the resource allocation field in the scheduling grant.

The combinatorial index r corresponds to a starting and ending RBG index of resource block set 1, $s_0$ and $s_1-1$, and resource block set 2, $s_2$ and $s_3-1$ respectively, where r is given by equation $$r = \sum_{i=0}^{M-1} \binom{N-s_i}{M-i}$$

defined in subclause 7.2.1 with M=4 and $N=\lceil N_{RB}^{UL}/P\rceil+1$. Subclause 7.2.1 also defines ordering properties and range of values that $s_i$ (RBG indices) map to. Only a single RBG is allocated for a set at the starting RBG index if the corresponding ending RBG index equals the starting RBG index.

9.1 UE Procedure for Determining Physical Downlink Control Channel Assignment 9.1.1 PDCCH Assignment Procedure The control region of each serving cell consists of a set of CCEs, numbered from 0 to $N_{CCE,k}-1$ according to subclause 6.8.1 in [3], where $N_{CCE,k}$ is the total number of CCEs in the control region of subframe k. The UE shall monitor a set of PDCCH candidates on one or more activated serving cells as configured by higher layer signalling for control information in every non-DRX subframe, where monitoring implies attempting to decode each of the PDCCHs in the set according to all the monitored DCI formats.

The set of PDCCH candidates to monitor are defined in terms of search spaces, where a search space $S_k^{(L)}$ at aggregation level $L\in\{1,2,4,8\}$ is defined by a set of PDCCH candidates. For each serving cell on which PDCCH is monitored, the CCEs corresponding to PDCCH candidate m of the search space $S_k^{(L)}$ are given by $$L\{(Y_k+m')\mathrm{mod}\lfloor N_{CCE,k}/L\rfloor\}+i$$

where $Y_k$ is defined below, i=0, . . . , L−1. For the common search space m'=m. For the UE specific search space, for the serving cell on which PDCCH is monitored, if the monitoring UE is configured with carrier indicator field then m'=m+$M^{(L)}\cdot n_{CI}$ where $n_{CI}$ is the carrier indicator field value, else if the monitoring UE is not configured with carrier indicator field then m'=m, where m=0, . . . , $M^{(L)}-1$. $M^{(L)}$ is the number of PDCCH candidates to monitor in the given search space.

Note that the carrier indicator field value is the same as ServCellIndex given in [11].

The UE shall monitor one common search space at each of the aggregation levels 4 and 8 on the primary cell.

A UE not configured with a carrier indicator field shall monitor one UE-specific search space at each of the aggregation levels 1, 2, 4, 8 on each activated serving cell. A UE configured with a carrier indicator field shall monitor one or more UE-specific search spaces at each of the aggregation levels 1, 2, 4, 8 on one or more activated serving cells as configured by higher layer signalling.

The common and UE-specific search spaces on the primary cell may overlap.

A UE configured with the carrier indicator field associated with monitoring PDCCH on serving cell c shall monitor PDCCH configured with carrier indicator field and with CRC scrambled by C-RNTI in the UE specific search space of serving cell c.

A UE configured with the carrier indicator field associated with monitoring PDCCH on the primary cell shall monitor PDCCH configured with carrier indicator field and with CRC scrambled by SPS C-RNTI in the UE specific search space of the primary cell.

The UE shall monitor the common search space for PDCCH without carrier indicator field.

For the serving cell on which PDCCH is monitored, if the UE is not configured with a carrier indicator field, it shall monitor the UE specific search space for PDCCH without carrier indicator field, if the UE is configured with a carrier indicator field it shall monitor the UE specific search space for PDCCH with carrier indicator field.

A UE is not expected to monitor the PDCCH of a secondary cell if it is configured to monitor PDCCH with carrier indicator field corresponding to that secondary cell in another serving cell. For the serving cell on which PDCCH is monitored, the UE shall monitor PDCCH candidates at least for the same serving cell.

A UE configured to monitor PDCCH candidates with CRC scrambled by C-RNTI or SPS C-RNTI with a common payload size and with the same first CCE index $n_{CCE}$ (as described in subclause 10.1) but with different sets of DCI information fields as defined in [4] in the
- common search space
- UE specific search space on the primary cell shall assume that for the PDCCH candidates with CRC scrambled by C-RNTI or SPS C-RNTI,
- if the UE is configured with the carrier indicator field associated with monitoring the PDCCH on the primary cell, only the PDCCH in the common search space is transmitted by the primary cell;
- otherwise, only the PDCCH in the UE specific search space is transmitted by the primary cell.

A UE configured to monitor PDCCH candidates in a given serving cell with a given DCI format size with CIF, and CRC scrambled by C-RNTI, where the PDCCH candidates may have one or more possible values of CIF for the given DCI format size, shall assume that a PDCCH candidate with the given DCI format size may be transmitted in the given serving cell in any UE specific search space corresponding to any of the possible values of CIF for the given DCI format size.

The aggregation levels defining the search spaces are listed in Table 9.1.1-1. The DCI formats that the UE shall monitor depend on the configured transmission mode per each serving cell as defined in subclause 7.1.

Table 9.1.1-1 of 3GPP TS 36.213 V10.13.0,
Entitled "PDCCH Candidates Monitored by a UE",
is Reproduced as FIG. 7

For the common search spaces, $Y_k$ is set to 0 for the two aggregation levels L=4 and L=8.

For the UE-specific search space $S_k^{(L)}$ at aggregation level L, the variable $Y_k$ is defined by $$Y_k = (A \cdot Y_{k-1}) \bmod D$$

where $Y_{-1} = n_{RNTI} \neq 0$, A=39827, D=65537 and $k = \lfloor n_s/2 \rfloor$, $n_s$ is the slot number within a radio frame. The RNTI value used for $n_{RNTI}$ is defined in subclause 7.1 in downlink and clause 8 in uplink.

3GPP TS 36.212 V10.9.0 provides the following downlink control information related description:

5.3.3 Downlink Control Information

A DCI transports downlink or uplink scheduling information, requests for aperiodic CQI reports, notifications of MCCH change [6] or uplink power control commands for one cell and one RNTI. The RNTI is implicitly encoded in the CRC.

Figure 5.3.3-1 shows the processing structure for one DCI. The following coding steps can be identified:
Information element multiplexing
CRC attachment
Channel coding
Rate matching
The coding steps for DCI are shown in the figure below.

Figure 8:
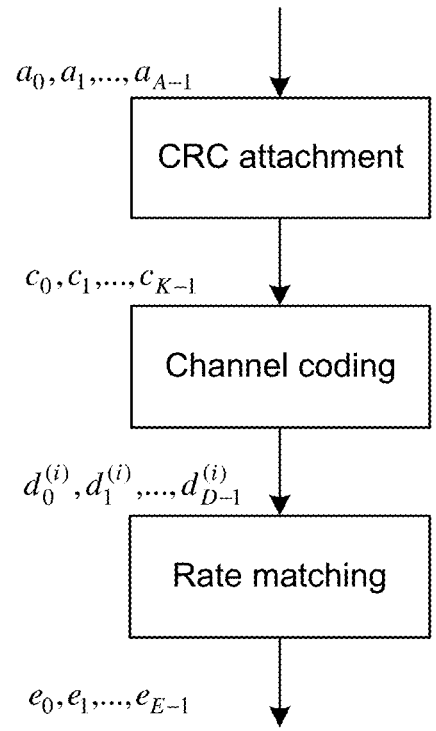
FIG. 8 is a reproduction of Figure 5.3.3-1 of 3GPP TS 36.212 V10.9.0.

Figure 5.3.3-1 of 3GPP TS 36.212 V10.9.0,
Entitled "Processing for One DCI", is Reproduced
as FIG. 8

5.3.3.1 DCI Formats

The fields defined in the DCI formats below are mapped to the information bits $a_0$ to $a_{A-1}$ as follows.

Each field is mapped in the order in which it appears in the description, including the zero-padding bit(s), if any, with the first field mapped to the lowest order information bit $a_0$ and each successive field mapped to higher order information bits. The most significant bit of each field is mapped to the lowest order information bit for that field, e.g. the most significant bit of the first field is mapped to $a_0$.

5.3.3.1.1 Format 0

DCI format 0 is used for the scheduling of PUSCH in one UL cell.

The following information is transmitted by means of the DCI format 0:
Carrier indicator—0 or 3 bits. This field is present according to the definitions in [3].
Flag for format0/format1A differentiation—1 bit, where value 0 indicates format 0 and value 1 indicates format 1A
Frequency hopping flag—1 bit as defined in section 8.4 of [3]. This field is used as the MSB of the corresponding resource allocation field for resource allocation type 1.
Resource block assignment and hopping resource allocation—$\lceil \log_2(N_{RB}^{DL}(N_{RB}^{DL}+1)/2) \rceil$ bits
For PUSCH hopping (resource allocation type 0 only):
$N_{UL\_hop}$ MSB bits are used to obtain the value of $\tilde{n}_{PRB}(i)$ as indicated in section 8.4 of [3]
$(\lceil \log_2(N_{RB}^{UL}(N_{RB}^{UL}+1)/2) \rceil - N_{UL\_hop})$ bits provide the resource allocation of the first slot in the UL subframe
For non-hopping PUSCH with resource allocation type 0:
$(\lceil \log_2(N_{RB}^{UL}(N_{RB}^{UL}+1)/2) \rceil)$ bits provide the resource allocation in the UL subframe as defined in section 8.1.1 of [3]
For non-hopping PUSCH with resource allocation type 1:
The concatenation of the frequency hopping flag field and the resource block assignment and hopping resource allocation field provides the resource allocation field in the UL subframe as defined in section 8.1.2 of [3]
Modulation and coding scheme and redundancy version—5 bits as defined in section 8.6 of [3]
New data indicator—1 bit
TPC command for scheduled PUSCH—2 bits as defined in section 5.1.1.1 of [3]
Cyclic shift for DM RS and OCC index—3 bits as defined in section 5.5.2.1.1 of [2]
UL index—2 bits as defined in sections 5.1.1.1, 7.2.1, 8 and 8.4 of [3] (this field is present only for TDD operation with uplink-downlink configuration 0)
Downlink Assignment Index (DAI)—2 bits as defined in section 7.3 of [3] (this field is present only for TDD operation with uplink-downlink configurations 1-6)
CSI request—1 or 2 bits as defined in section 7.2.1 of [3]. The 2-bit field applies to UEs that are configured with more than one DL cell and when the corresponding DCI format is mapped onto the UE specific search space given by the C-RNTI as defined in [3]; otherwise the 1-bit field applies
SRS request—0 or 1 bit. This field can only be present in DCI formats scheduling PUSCH which are mapped onto the UE specific search space given by the C-RNTI as defined in [3]. The interpretation of this field is provided in section 8.2 of [3]
Resource allocation type—1 bit. This field is only present if $N_{RB}^{UL} \leq N_{RB}^{DL}$. The interpretation of this field is provided in section 8.1 of [3]

If the number of information bits in format 0 mapped onto a given search space is less than the payload size of format 1A for scheduling the same serving cell and mapped onto the same search space (including any padding bits appended to format 1A), zeros shall be appended to format 0 until the payload size equals that of format 1A.

5.3.3.1.2 Format 1

DCI format 1 is used for the scheduling of one PDSCH codeword in one cell.

The following information is transmitted by means of the DCI format 1:
Carrier indicator—0 or 3 bits. This field is present according to the definitions in [3].
Resource allocation header (resource allocation type 0/type 1)—1 bit as defined in section 7.1.6 of [3]
If downlink bandwidth is less than or equal to 10 PRBs, there is no resource allocation header and resource allocation type 0 is assumed.
Resource block assignment:
For resource allocation type 0 as defined in section 7.1.6.1 of [3]:
$\lceil N_{RB}^{DL}/P \rceil$ bits provide the resource allocation
For resource allocation type 1 as defined in section 7.1.6.2 of [3]:
$\lceil \log_2(P) \rceil$ bits of this field are used as a header specific to this resource allocation type to indicate the selected resource blocks subset
1 bit indicates a shift of the resource allocation span
$(\lceil N_{RB}^{DL}/P \rceil - \lceil \log_2(P) \rceil - 1)$ bits provide the resource allocation where the value of P depends on the number of DL resource blocks as indicated in section 7.1.6.1 of [3]

Modulation and coding scheme—5 bits as defined in section 7.1.7 of [3]

HARQ process number—3 bits (FDD), 4 bits (TDD)

New data indicator—1 bit

Redundancy version—2 bits

TPC command for PUCCH—2 bits as defined in section 5.1.2.1 of [3]

Downlink Assignment Index (this field is present in TDD for all the uplink-downlink configurations and only applies to TDD operation with uplink-downlink configuration 1-6. This field is not present in FDD)—2 bits If the UE is not configured to decode PDCCH with CRC scrambled by the C-RNTI and the number of information bits in format 1 is equal to that for format 0/1A, one bit of value zero shall be appended to format 1.

If the UE is configured to decode PDCCH with CRC scrambled by the C-RNTI and the number of information bits in format 1 is equal to that for format 0/1A for scheduling the same serving cell and mapped onto the UE specific search space given by the C-RNTI as defined in [3], one bit of value zero shall be appended to format 1.

If the number of information bits in format 1 belongs to one of the sizes in Table 5.3.3.1.2-1, one or more zero bit(s) shall be appended to format 1 until the payload size of format 1 does not belong to one of the sizes in Table 5.3.3.1.2-1 and is not equal to that of format 0/1A mapped onto the same search space.

[ . . . ]

5.3.3.1.3 Format 1A

DCI format 1A is used for the compact scheduling of one PDSCH codeword in one cell and random access procedure initiated by a PDCCH order.

The following information is transmitted by means of the DCI format 1A:

Carrier indicator—0 or 3 bits. This field is present according to the definitions in [3].

Flag for format0/format1A differentiation—1 bit, where value 0 indicates format 0 and value 1 indicates format 1A Format 1A is used for random access procedure initiated by a PDCCH order only if format 1A CRC is scrambled with C-RNTI and all the remaining fields are set as follows:

Localized/Distributed VRB assignment flag—1 bit is set to '0'

Resource block assignment—$\lceil \log_2(N_{RB}^{DL}(N_{RB}^{DL}+1)/2)\rceil$ bits, where all bits shall be set to 1

Preamble Index—6 bits

PRACH Mask Index—4 bits, [5]

All the remaining bits in format 1A for compact scheduling assignment of one PDSCH codeword are set to zero Otherwise, Localized/Distributed VRB assignment flag—1 bit as defined in 7.1.6.3 of [3]

Resource block assignment—$\lceil \log_2(N_{RB}^{DL}(N_{RB}^{DL}+1)/2)\rceil$ bits as defined in section 7.1.6.3 of [3]:

For localized VRB:

$\lceil \log_2(N_{RB}^{DL}(N_{RB}^{DL}+1)/2)\rceil$ bits provide the resource allocation For distributed VRB:

If $N_{RB}^{DL} < 50$ or if the format 1A CRC is scrambled by RA-RNTI, P-RNTI, or SI-RNTI $\lceil \log_2(N_{RB}^{DL}(N_{RB}^{DL}+1)/2)\rceil$ bits provide the resource allocation Else 1 bit, the MSB indicates the gap value, where value 0 indicates $N_{gap}=N_{gap,1}$ and value 1 indicates $N_{gap}=N_{gap,2}$ ($\lceil \log_2(N_{RB}^{DL}(N_{RB}^{DL}+1)/2)\rceil$)−1 bits provide the resource allocation, where $N_{gap}$ is defined in [2].

Modulation and coding scheme—5 bits as defined in section 7.1.7 of [3]

HARQ process number—3 bits (FDD), 4 bits (TDD)

New data indicator—1 bit

If the format 1A CRC is scrambled by RA-RNTI, P-RNTI, or SI-RNTI:

If $N_{RB}^{DL} \geq 50$ and Localized/Distributed VRB assignment flag is set to 1 the new data indicator bit indicates the gap value, where value 0 indicates $N_{gap}=N_{gap,1}$ and value 1 indicates $N_{gap}=N_{gap,2}$.

Else the new data indicator bit is reserved.

Else

The new data indicator bit as defined in [5]

Redundancy version—2 bits

TPC command for PUCCH—2 bits as defined in section 5.1.2.1 of [3]

If the format 1A CRC is scrambled by RA-RNTI, P-RNTI, or SI-RNTI:

The most significant bit of the TPC command is reserved.

The least significant bit of the TPC command indicates column $N_{PRB}^{1A}$ of the TBS table defined of [3].

If least significant bit is 0 then $N_{PRB}^{1A}=2$ else $N_{PRB}^{1A}3$.

Else

The two bits including the most significant bit indicates the TPC command

Downlink Assignment Index (this field is present in TDD for all the uplink-downlink configurations and only applies to TDD operation with uplink-downlink configuration 1-6. This field is not present in FDD)—2 bits SRS request—0 or 1 bit. This field can only be present in DCI formats scheduling PDSCH which are mapped onto the UE specific search space given by the C-RNTI as defined in [3]. The interpretation of this field is provided in section 8.2 of [3]

If the UE is not configured to decode PDCCH with CRC scrambled by the C-RNTI, and the number of information bits in format 1A is less than that of format 0, zeros shall be appended to format 1A until the payload size equals that of format 0.

If the UE is configured to decode PDCCH with CRC scrambled by the C-RNTI and the number of information bits in format 1A mapped onto a given search space is less than that of format 0 for scheduling the same serving cell and mapped onto the same search space, zeros shall be appended to format 1A until the payload size equals that of format 0, except when format 1A assigns downlink resource on a secondary cell without an uplink configuration associated with the secondary cell.

If the number of information bits in format 1A belongs to one of the sizes in Table 5.3.3.1.2-1, one zero bit shall be appended to format 1A.

When the format 1A CRC is scrambled with a RA-RNTI, P-RNTI, or SI-RNTI then the following fields among the fields above are reserved:

HARQ process number
Downlink Assignment Index (used for TDD only and is not present in FDD)
[ . . . ]

5.3.3.1.8 Format 4

DCI format 4 is used for the scheduling of PUSCH in one UL cell with multi-antenna port transmission mode, The following information is transmitted by means of the DCI format 4:

Carrier indicator—0 or 3 bits. The field is present according to the definitions in [3].

Resource block assignment–

$$\max\left(\lceil \log_2(N_{RB}^{UL}(N_{RB}^{UL}+1)/2)\rceil, \left\lceil \log_2\left(\binom{\lceil N_{RB}^{UL}/P+1\rceil}{4}\right)\right\rceil\right) \text{ bits,}$$

where P is the UL RBG size as defined in section 8.1.2 of [3]

For resource allocation type 0:
The ($\lceil \log_2(N_{RB}^{UL}(N_{RB}^{UL}+1)/2)\rceil$) LSBs provide the resource allocation in the UL subframe as defined in section 8.1.1 of [3]

For resource allocation type 1:
The $$\left\lceil \log_2\left(\binom{\lceil N_{RB}^{UL}/P+1\rceil}{4}\right)\right\rceil$$

LSBs provide the resource allocation in the UL subframe as defined in section 8.1.2 of [3]

TPC command for scheduled PUSCH—2 bits as defined in section 5.1.1.1 of [3]

Cyclic shift for DM RS and OCC index—3 bits as defined in section 5.5.2.1.1 of [2]

UL index—2 bits as defined in sections 5.1.1.1, 7.2.1, 8 and 8.4 of [3] (this field is present only for TDD operation with uplink-downlink configuration 0)

Downlink Assignment Index (DAI)—2 bits as defined in section 7.3 of [3] (this field is present only for TDD operation with uplink-downlink configurations 1-6)

CSI request—1 or 2 bits as defined in section 7.2.1 of [3]. The 2-bit field applies to UEs that are configured with more than one DL cell; otherwise the 1-bit field applies SRS request—2 bits as defined in section 8.2 of [3]

Resource allocation type—1 bit as defined in section 8.1 of [3]

In addition, for transport block 1:

Modulation and coding scheme and redundancy version—5 bits as defined in section 8.6 of [3]

New data indicator—1 bit

In addition, for transport block 2:

Modulation and coding scheme and redundancy version—5 bits as defined in section 8.6 of [3]

New data indicator—1 bit

Precoding information and number of layers: number of bits as specified in Table 5.3.3.1.8-1. Bit field as shown in Table 5.3.3.1.8-2 and Table 5.3.3.1.8-3. Note that TPMI for 2 antenna ports indicates which codebook index is to be used in Table 5.3.3A.2-1 of [2], and TPMI for 4 antenna ports indicates which codebook index is to be used in Table 5.3.3A.2-2, Table 5.3.3A.2-3, Table 5.3.3A.2-4 and Table 5.3.3A.2-5 of [2]. If both transport blocks are enabled, transport block 1 is mapped to codeword 0; and transport block 2 is mapped to codeword 1. In case one of the transport blocks is disabled, the transport block to codeword mapping is specified according to Table 5.3.3.1.5-2. For a single enabled codeword, indices 24 to 39 in Table 5.3.3.1.8-3 are only supported for retransmission of the corresponding transport block if that transport block has previously been transmitted using two layers.
[ . . . ]

If the number of information bits in format 4 is equal to the payload size for DCI format 1, 2, 2A, 2B or 2C associated with the configured DL transmission mode in the same serving cell, one zero bit shall be appended to format 4.

5.3.3.2 CRC Attachment

Error detection is provided on DCI transmissions through a Cyclic Redundancy Check (CRC).

The entire PDCCH payload is used to calculate the CRC parity bits. Denote the bits of the PDCCH payload by $a_0, a_1, a_2, a_3, \ldots, a_{A-1}$, and the parity bits by $p_0, p_1, p_2, p_3, \ldots, p_{L-1}$. A is the PDCCH payload size and L is the number of parity bits.

The parity bits are computed and attached according to section 5.1.1 setting L to 16 bits, resulting in the sequence $b_0, b_1, b_2, b_3, \ldots, b_{B-1}$, where B=A+L.

In the case where UE transmit antenna selection is not configured or applicable, after attachment, the CRC parity bits are scrambled with the corresponding RNTI $x_{rnti,0}, x_{rnti,1}, \ldots, x_{rnti,15}$, where $x_{rnti,0}$ corresponds to the MSB of the RNTI, to form the sequence of bits $c_0, c_1, c_2, c_3, \ldots, c_{B-1}$. The relation between $c_k$ and $b_k$ is:

$c_k = b_k$ for $k=0, 1, 2, \ldots, A-1$ $c_k=(b_k+x_{rnti,k-A})\bmod 2$ for $k=A, A+1, A+2, \ldots, A+15$.

In the case where UE transmit antenna selection is configured and applicable, after attachment, the CRC parity bits of PDCCH with DCI format 0 are scrambled with the antenna selection mask $x_{AS,0}, x_{AS,1}, \ldots, x_{AS,15}$ as indicated in Table 5.3.3.2-1 and the corresponding RNTI $x_{rnti,0}, x_{rnti,1}, \ldots, x_{rnti,15}$ to form the sequence of bits $c_0, c_1, c_2, c_3, \ldots, c_{B-1}$. The relation between $c_k$ and $b_k$ is:

$c_k = b_k$ for $k=0, 1, 2, \ldots, A-1$ $c_k=(b_k+x_{rnti,k-A}+x_{AS,k-A})\bmod 2$ for $k=A, A+1, A+2, \ldots, A+15$.

[ . . . ]

5.3.3.3 Channel Coding

Information bits are delivered to the channel coding block. They are denoted by $c_0, c_1, c_2, c_3, \ldots c_{K-1}$, where K is the number of bits, and they are tail biting convolutionally encoded according to section 5.1.3.1.

After encoding the bits are denoted by $d_0^{(i)}, d_1^{(i)}, d_2^{(i)}, d_3^{(i)}, \ldots, d_{D-1}^{(i)}$, with i=0,1, and 2, and where D is the number of bits on the i-th coded stream, i.e., D=K.

5.3.3.4 Rate Matching

A tail biting convolutionally coded block is delivered to the rate matching block. This block of coded bits is denoted by $d_0^{(i)}, d_1^{(i)}, d_2^{(i)}, d_3^{(i)}, \ldots, d_{D-1}^{(i)}$, with i=0,1, and 2, and where i is the coded stream index and D is the number of bits in each coded stream. This coded block is rate matched according to section 5.1.4.2.

After rate matching, the bits are denoted by $e_0, e_1, e_2, e_3, \ldots, e_{E-1}$, where E is the number of rate matched bits.

5.3.4 Control Format Indicator

Data arrives each subframe to the coding unit in the form of an indicator for the time span, in units of OFDM symbols, of the DCI in that subframe of the corresponding DL cell. The CFI takes values CFI=1, 2 or 3. For system bandwidths $N_{RB}^{DL}>10$, the span of the DCI in units of OFDM symbols, 1, 2 or 3, is given by the CFI. For system bandwidths Na the span of the DCI in units of OFDM symbols, 2, 3 or 4, is given by CFI+1.

The coding flow is shown in Figure 5.3.4-1.

Figure 9:
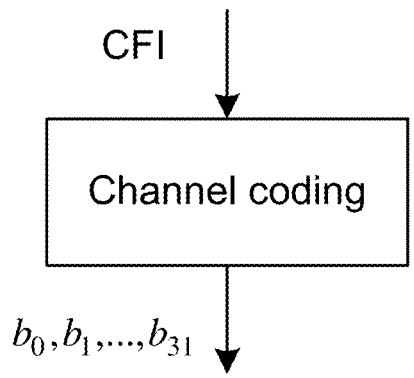
FIG. 9 is a reproduction of Figure 5.3.4-1 of 3GPP TS 36.212 V10.9.0.

Figure 5.3.4-1 of 3GPP TS 36.212 V10.9.0, Entitled "Coding for CFI", is Reproduced as FIG. 9

5.3.4.1 Channel Coding

The control format indicator is coded according to Table 5.3.4-1.

Table 5.3.4-1 of 3GPP TS 36.212 V10.9.0, Entitled "CFI Code Words", is Reproduced as FIG. 10

3GPP TS 36.211 V10.7.0 states:
6.7 Physical Control Format Indicator Channel The physical control format indicator channel carries information about the number of OFDM symbols used for transmission of PDCCHs in a subframe. The set of OFDM symbols possible to use for PDCCH in a subframe is given by Table 6.7-1.

Table 6.7-1 of 3GPP TS 36.211 V10.7.0, entitled "Number of OFDM symbols used for PDCCH", is reproduced as FIG. 11

The PCFICH shall be transmitted when the number of OFDM symbols for PDCCH is greater than zero.

6.7.1 Scrambling

The block of bits $b(0), \ldots, b(31)$ transmitted in one subframe shall be scrambled with a cell-specific sequence prior to modulation, resulting in a block of scrambled bits $\tilde{b}(0), \ldots, \tilde{b}(31)$ according to $$\tilde{b}(i)=(b(i)+c(i)) \bmod 2$$

where the scrambling sequence $c(i)$ is given by Section 7.2. The scrambling sequence generator shall be initialised with $c_{init}=(\lfloor n_s/2 \rfloor+1) \cdot (2N_{ID}^{cell}+1) \cdot 2^9+N_{ID}^{cell}$ at the start of each subframe.

6.7.2 Modulation

The block of scrambled bits $\tilde{b}(0), \ldots, \tilde{b}(31)$ shall be modulated as described in Section 7.1, resulting in a block of complex-valued modulation symbols $d(0), \ldots, d(15)$. Table 6.7.2-1 specifies the modulation mappings applicable for the physical control format indicator channel.

Table 6.7.2-1 of 3GPP TS 36.211 V10.7.0, Entitled "PCFICH Modulation Schemes", is Reproduced as FIG. 12

6.7.3 Layer Mapping and Precoding

The block of modulation symbols $d(0), \ldots, d(15)$ shall be mapped to layers according to one of Sections 6.3.3.1 or 6.3.3.3 with $M_{symb}^{(0)}=16$ and precoded according to one of Sections 6.3.4.1 or 6.3.4.3, resulting in a block of vectors $y(i)=[y^{(0)}(i) \ldots y^{(P-1)}(i)]^T$, $i=0, \ldots, 15$, where $y^{(p)}(i)$ represents the signal for antenna port p and where $p=0, \ldots, P-1$ and the number of antenna ports for cell-specific reference signals $P \in \{1,2,4\}$. The PCFICH shall be transmitted on the same set of antenna ports as the PBCH.

6.7.4 Mapping to Resource Elements

The mapping to resource elements is defined in terms of quadruplets of complex-valued symbols. Let $z^{(p)}(i)=\langle y^{(p)}(4i), y^{(p)}(4i+1), y^{(p)}(4i+2), y^{(p)}(4i+3) \rangle$ denote symbol quadruplet i for antenna port p. For each of the antenna ports, symbol quadruplets shall be mapped in increasing order of i to the four resource-element groups in the first OFDM symbol in a downlink subframe with the representative resource-element as defined in Section 6.2.4 given by $z^{(p)}(0)$ is mapped to the resource-element group represented by $k=\bar{k}$ $z^{(p)}(1)$ is mapped to the resource-element group represented by $k=\bar{k}+\lfloor N_{RB}^{DL}/2 \rfloor \cdot N_{SC}^{RB}/2$ $z^{(p)}(2)$ is mapped to the resource-element group represented by $k=\bar{k}+\lfloor 2N_{RB}^{DL}/2 \rfloor \cdot N_{SC}^{RB}/2$ $z^{(p)}(3)$ is mapped to the resource-element group represented by $k=\bar{k}+\lfloor 3N_{RB}^{DL}/2 \rfloor \cdot N_{SC}^{RB}/2$ where the additions are modulo $N_{RB}^{DL}N_{SC}^{DL}$, $$\bar{k}=(N_{SC}^{RB}/2) \cdot (N_{ID}^{cell} \bmod 2 N_{RB}^{DL})$$

and $N_{ID}^{cell}$ is the physical-layer cell identity as given by Section 6.11.

6.8 Physical Downlink Control Channel
6.8.1 PDCCH Formats

The physical downlink control channel carries scheduling assignments and other control information. A physical control channel is transmitted on an aggregation of one or several consecutive control channel elements (CCEs), where a control channel element corresponds to 9 resource element groups. The number of resource-element groups not assigned to PCFICH or PHICH is $N_{REG}$. The CCEs available in the system are numbered from 0 to $N_{CCE}-1$, where $N_{CCE}=\lfloor N_{REG}/9 \rfloor$. The PDCCH supports multiple formats as listed in Table 6.8.1-1. A PDCCH consisting of n consecutive CCEs may only start on a CCE fulfilling i mod n=0, where i is the CCE number.

Multiple PDCCHs can be transmitted in a subframe.

Table 6.8.1-1 of 3GPP TS 36.211 V10.7.0, Entitled "Supported PDCCH Formats", is Reproduced as FIG. 13

6.8.2 PDCCH Multiplexing and Scrambling

The block of bits $b^{(i)}(0), \ldots, b^{(i)}(M_{bit}^{(i)}-1)$ on each of the control channels to be transmitted in a subframe, where $M_{bit}^{(i)}$ is the number of bits in one subframe to be transmitted on physical downlink control channel number i, shall be multiplexed, resulting in a block of bits $b^{(0)}(0), \ldots, b^{(0)}(M_{bit}^{(0)}-1), b^{(1)}(0), \ldots, b^{(1)}(M_{bit}^{(1)}-1), \ldots, b^{(n_{PDCCH}-1)}(0), \ldots, b^{(n_{PDCCH}-1)}(M_{bit}^{(n_{PDCCH}-1)}-1)$, where $n_{PDCCH}$ is the number of PDCCHs transmitted in the subframe.

The block of bits $b^{(0)}(0), \ldots, b^{(0)}(M_{bit}^{(0)}-1), b^{(1)}(0), \ldots, b^{(1)}(M_{bit}^{(1)}-1), \ldots, b^{(n_{PDCCH}-1)}(0), \ldots, b^{(n_{PDCCH}-1)}(M_{bit}^{(n_{PDCCH}-1)}-1)$ shall be scrambled with a cell-specific sequence prior to modulation, resulting in a block of scrambled bits $\tilde{b}(0), \ldots, \tilde{b}(M_{tot}-1)$ according to $$\tilde{b}(i)=(b(i)+c(i)) \bmod 2$$

where the scrambling sequence $c(i)$ is given by Section 7.2. The scrambling sequence generator shall be initialised with $c_{init}=\lfloor n_s/2 \rfloor 2^9+N_{ID}^{cell}$ at the start of each subframe.

CCE number n corresponds to bits $b(72n), b(72n+1), \ldots, b(72n+71)$. If necessary, <NIL> elements shall be inserted in the block of bits prior to scrambling to ensure that the PDCCHs starts at the CCE positions as described in [4] and to ensure that the length $M_{tot}=8N_{REG} \geq \Sigma_{i=0}^{n_{PDCCH}-1} M_{bit}^{(i)}$ of the scrambled block of bits matches the amount of resource-element groups not assigned to PCFICH or PHICH.

6.8.3 Modulation

The block of scrambled bits $\tilde{b}(0), \ldots, \tilde{b}(M_{tot}-1)$ shall be modulated as described in Section 7.1, resulting in a block of complex-valued modulation symbols $d(0), \ldots, d(M_{symb}-1)$. Table 6.8.3-1 specifies the modulation mappings applicable for the physical downlink control channel.

Table 6.8.3-1 of 3GPP TS 36.211 V10.7.0, Entitled "PDCCH Modulation Schemes", is Reproduced as FIG. 14

6.8.4 Layer Mapping and Precoding

The block of modulation symbols $d(0), \ldots, d(M_{symb}-1)$ shall be mapped to layers according to one of Sections 6.3.3.1 or 6.3.3.3 with $M_{symb}^{(i)}=M_{symb}$ and precoded according to one of Sections 6.3.4.1 or 6.3.4.3, resulting in a block of vectors $y(i)=[y^{(0)}(i) \ldots y^{(P-1)}(i)]^T$, $i=0, \ldots, M_{symb}-1$ to be mapped onto resources on the antenna ports used for transmission, where $y^{(p)}(i)$ represents the signal for antenna port p. The PDCCH shall be transmitted on the same set of antenna ports as the PBCH.

6.8.5 Mapping to Resource Elements

The mapping to resource elements is defined by operations on quadruplets of complex-valued symbols. Let $z^{(p)}(i)=\langle y^{(p)}(4i), y^{(p)}(4i+1), y^{(p)}(4i+2), y^{(p)}(4i+3) \rangle$ denote symbol quadruplet i for antenna port p.

The block of quadruplets $z^{(p)}(0), \ldots, z^{(p)}(M_{quad}-1)$, where $M_{quad}=M_{symb}/4$, shall be permuted resulting in $w^{(p)}(0), \ldots, w^{(p)}(M_{quad}-1)$. The permutation shall be according to the sub-block interleaver in Section 5.1.4.2.1 of [3] with the following exceptions:

the input and output to the interleaver is defined by symbol quadruplets instead of bits interleaving is performed on symbol quadruplets instead of bits by substituting the terms "bit", "bits" and "bit sequence" in Section 5.1.4.2.1 of [3] by "symbol quadruplet", "symbol quadruplets" and "symbol-quadruplet sequence", respectively <NULL> elements at the output of the interleaver in [3] shall be removed when forming $w^{(p)}(0), \ldots, w^{(p)}(M_{quad}-1)$. Note that the removal of <NULL> elements does not affect any <NIL> elements inserted in Section 6.8.2.

The block of quadruplets $w^{(p)}(0), \ldots, w^{(p)}(M_{quad}-1)$ shall be cyclically shifted, resulting in $\overline{w}^{(p)}(0), \ldots, \overline{w}^{(p)}(M_{quad}-1)$ where $\overline{w}^{(p)}(i)=w^{(p)}((i+N_{ID}^{cell}) \mod M_{quad})$.

Mapping of the block of quadruplets $\overline{w}^{(p)}(0), \ldots, \overline{w}^{(p)}(M_{quad}-1)$ is defined in terms of resource-element groups, specified in Section 6.2.4, according to steps 1-10 below:

1) Initialize m'=0 (resource-element group number)
2) Initialize k'=0
3) Initialize r=0
4) If the resource element (k', l') represents a resource-element group and the resource-element group is not assigned to PCFICH or PHICH then perform step 5 and 6, else go to step 7
5) Map symbol-quadruplet $\overline{w}^{(p)}(m')$ to the resource-element group represented by (k', l') for each antenna port p
6) Increase m' by 1
7) Increase l' by 1
8) Repeat from step 4 if l'<L, where L corresponds to the number of OFDM symbols used for PDCCH transmission as indicated by the sequence transmitted on the PCFICH
9) Increase k' by 1
10) Repeat from step 3 if $k'<N_{RB}^{DL} \cdot N_{SC}^{RB}$ 3GPP R1-1608633 states:

Resource Mapping of DMRS-based sPDCCH

There are two kinds of transmission formats for legacy EPDCCH, one is distributed transmission that one ECCE with n EREGs can be distributed over n PRB pairs to achieve frequency diversity gain. The other is localized transmission that EREGs of one ECCE are located in one PRB pair to obtain frequency scheduling gain. Accordingly, two resource mapping methods for DMRS-based sPDCCH are provided. Both distributed and localized resource mapping can be used in normal subframes as well as MBSFN subframes where there is no CRS transmission.

Distributed Resource Mapping

The target of distributed resource mapping is to obtain frequency diversity gain, which is similar to CRS-based sPDCCH. In this case, the similar mapping rule of legacy PDCCH could be reused. For example, as shown in FIG. 2, sPDCCH region is common to all sTTI UEs and is located in the first symbol to reduce the processing time. Accordingly, a common DMRS port without precoding is used for sPDCCH demodulation. (common DMRS port) To reduce DMRS overhead, for each scheduled UE with DMRS based TMs, the DMRS for sPDSCH demodulation with UE-specific precoding information is transmitted at the same RE of DMRS based sPDCCH, for example DMRS for sPDCCH and sPDSCH are CDMed with different antenna ports.

The DMRS port for sPDCCH is transmitted in the whole sTTI band while the DMRS port(s) for sPDSCH are transmitted only in the sPDSCH bandwidth. Note that unused REs in common sPDCCH region shall be used for sPDSCH transmission.

In MBSFN subframe, the port for sPDCCH demodulation can also be used for fast CQI measurement and report for sTTI UE.

Localized Resource Mapping

The target of localized resource mapping is to obtain frequency scheduling gain. Therefore, self-contained sPDCCH is preferred so that both sPDCCH and sPDSCH can achieve the beamforming gain. In this case, sPDCCH region for UE blind detection shall be indicated in advance, e.g., configured by RRC or indicated in slow DCI. When eNB are performing sTTI scheduling, the sDCIs are located in the corresponding sPDSCH region. If UL grants are required to be transmitted in the sTTI, they can be placed in the beginning of each scheduled DL grant, as shown in FIG. 3. The unused REs in sPDCCH region shall be used for sPDSCH transmission.

The DL grant and sPDSCH can share the same DMRS ports, e.g., the port for sPDCCH is port 7 and the ports for sPDSCH are port 7 and 8 for 2-layer transmission. The antenna port for UL grant and DL grant may be different since they are transmitted for different users, therefore, DMRS for UL grant demodulation and DL grant demodulation can be CDMed to reduce DMRS overhead.

Proposal 2: Support Distributed Resource Mapping and Localized Resource Mapping in DMRS-Based sPDCCH for sTTI.

3GPP R1-1608915 states:

Discussions

DL RS Design Requirement

First of all, the overhead of the DL RS for the sTTI needs to be low enough to guarantee the system efficiency. For CRS based transmission, it has been agreed during RAN1 84bis meeting on no change for CRS definition. For DMRS based sPDCCH/sPDSCH transmission, at least for 2-symbol sTTI, the DL RS may be needed in each sTTI, therefore, DMRS design should be designed with an acceptable overhead.

Secondly, CSI-RS has played an important role for TM8/9/10 and it is transmitted within the full downlink system bandwidth, and therefore when designing DMRS pattern for sTTI the collision with CSI-RS should be avoided as much as possible.

Thirdly, DMRS for sTTI should avoid the collision with CRS. When DMRS for sTTI and CRS are on the same OFDM symbol, they should be placed on different sub-carriers. If it is possible, it may be beneficial to put the DMRS on the symbols without CRS to mitigate the misalignment of the different interference between that of CRS and that of UE-specific (s)PDSCH from adjacent cells.

Fourthly, it is beneficial to locate DMRS in the first symbol for a 2-symbol sTTI, and therefore the UE can begin the channel estimation after having buffered the first symbol. This can speed up the total processing procedure of the downlink sTTI.

Fifthly, DMRS for sTTI should support MIMO transmission for sTTI. For the maximum number of supported layers, four layers may be appropriate at least for 2-symbol sTTI considering the tradeoff between the RS overhead and the system efficiency. On the other hand for slot based sTTI, up to 8 layers sPDSCH transmission can be considered.

Finally, DMRS design for sTTI should enable dynamic DMRS transmission to save the RS overhead. Note that it has been agreed in RAN1 #85 meeting that for DMRS of sPUSCH, for the case of less than 1-slot TTI length, to support DM-RS sharing/multiplexing of consecutive TTIs from one or multiple UEs. The similar sharing/multiplexing method can be used for downlink RS to save the RS overhead.

Therefore, based on the above discussion, we have the following proposal:

Proposal 1: design of the downlink DMRS for sTTI shall consider the following requirements:
  Low overhead
  Avoid the collision with CSI-RS as much as possible
  Avoid the collision with CRS
  Front-loaded within the sTTI
  Support up to 4/8 layers MIMO transmission for 2-symbols sTTI and slot based sTTI, respectively
  Enable dynamic DMRS transmission DL DMRS Design for 2-symbol sTTI In the following, we give some design examples of DL DMRS design for 2-symbol sTTI.

DMRS Pattern 1: DMRS on Symbols Without CRS

DMRS for sTTI is only located on symbols without CRS. The sub-carriers that DMRS uses are {0, 1, 6, 7} or {4, 5, 10, 11} (just as shown in FIG. 1). Note that by such design the effect of DMRS of sTTI on CSI-RS is minimized, only a few CSI-RS configuration are lost, i.e., 4 single port CSI-RS configurations are affected. Four REs are used for DMRS within each PRB resulting in a DMRS overhead of 1/6. In order to support MIMO transmission, at most four DMRS ports can be CDMed among the 4 DMRS subcarriers.

It can be seen by such DMRS design, most of the requirements in proposal 1 can be fulfilled. However, it also should be noted that based on the sTTI definition, in some sTTIs the DMRS may be not on the $1^{st}$ symbol which contains CRS.

DMRS Pattern 2: DMRS Always on the $1^{st}$ Symbol Within the sTTI

By this method, DMRS is only located on the $1^{st}$ symbol within the sTTI. If DMRS is on the symbols without CRS, the same subcarriers set as in DMRS pattern 1 can be used, otherwise if DMRS is on the symbols with CRS, DMRS shall use different sub-carriers from CRS to avoid the collision with CRS. The DMRS pattern for different CRS shift are shown in FIG. 2.

Compared with DMRS pattern 1, in DMRS pattern 2, DMRS is always on the $1^{st}$ symbol of the sTTI thus it is beneficial for fast decoding.

Proposal 2: The following DMRS patterns can be considered for 2-symbol sTTI:

DMRS pattern 1: DMRS is on symbols without CRS, DMRS uses REs set {0, 1, 6, 7} or {4, 5, 10, 11}.

DMRS pattern 2: DMRS is always on the $1^{st}$ symbol within the sTTI, and it uses REs set {0, 1, 6, 7} or {4, 5, 10, 11} if the $1^{st}$ symbol does not contain CRS, otherwise, it uses the non-CRS subcarriers.

DMRS Design for Slot-based sTTI

For slot based sTTI, one straightforward way is to reuse the current DMRS pattern, i.e., the DMRS in the symbol 5/6 in each slot. However, the drawback of this method is that the two DMRS symbols are too postpositional and not distributed within one slot uniformly enough. This may not be beneficial to get a balanced channel estimation performance within one slot.

Another way is to re-use the DMRS pattern of 2-symbol sTTI and all of or a subset of the DMRS pattern for 2-symbol sTTI within the corresponding slot can be reused. For example, when the above DMRS pattern 1 for 2-symbol sTTI is reused, the following pattern as in FIG. 3 can be considered for slot based sTTI. It can be seen that by such design the DMRS pattern becomes more uniformly distributed within one slot and more compatible with the DMRS pattern with 2-symbol sTTI.

Proposal 3: The DMRS pattern for slot based sTTI can be all of or a subset of the DMRS pattern for 2-symbol sTTI within the corresponding slot.

3GPP R1-1609823 states:

2. DMRS Designs for Short TTI

DMRS designs for short TTI has been considered in [1]-[4]. In this section, we consider the detailed DMRS design for 2/7 symbol short TTI.

[Table 1 shows the legacy DMRS overhead per TTI when the TTI length is 2, 7, and 14. For the 7 symbol case, the DMRS overhead is the same as the 14 symbol TTI and there is no need to design the new DMRS for the 7 symbol TTI case. For the 2 symbol TTI, the overhead is 3.5 times of the 7/14 symbol TTI.

Therefore, we have

Observation 1. For the 2 symbol TTI, it is necessary to reduce the DMRS overhead for sPDCCH/sPDSCH transmission.

Table 1 of R1-1609823, Entitled "Overhead of DL DMRS Per TTI When Legacy Design is Used", is Reproduced as FIG. 15

Now, we consider the DMRS design for 2 symbol TTI. In the following, we consider one or two ports DMRS. For four or eight ports DMRS, the same conclusions can be obtained. In 2 symbol TTI, CRS may collide with DMRS. For example, assume DMRS appears in each short TTI. As shown in FIG. 1, CRS collides with DMRS in OFDM symbol 4, 7, 8, and 11. To avoid this situation, it is suggested that the REs for DMRS are derived from cell-ID and not overlapped with CRS. For example, use a cell-specific shift such as $v_{shift}=N_{ID}^{cell}$ mod 3 in the frequency-domain allocation.

[ . . . ]

Proposal 1. The design of DMRS for short TTI should avoid the collision with CRS.

To avoid collision with CRS and reduce the overhead, we have

Alternative 1.
In time domain, DMRS appears in every two OFDM symbols.
In frequency domain,
the resource allocation of DMRS is cell-specific to avoid the collision with CRS.
reduce the density of DMRS.
Pros
No collision with CRS
Channel estimation can be done earlier and it helps to reduce the DL processing time.
Small DMRS overhead (8.33%)
Cons
Degradation on channel estimation performance.
Support up to two layers

[ . . . ]

Alternative 2.
In time domain, DMRS appears in every two short TTI.
Two contiguous sTTIs share the same DMRS position.
In frequency,
reduce the density of DMRS.
Pros
No collision with CRS
Channel estimation can be done earlier and it helps to reduce the DL processing time.
Small DMRS overhead (8.33%)
Cons
Degradation on channel estimation performance, especially in high mobility case.
Support up to four layers

[ . . . ]

In alternative 1 and 2, the DMRS overhead is reduced by decreasing the density of DMRS in time domain and the resulting overhead is very close to the case of 7/14 symbol TTI.

From above discussions, we have

Proposal 2. Consider alternative for alternative 2 for the DL DMRS design.

3GPP TS 36.211 states:

6.7 Physical Control Format Indicator Channel

The physical control format indicator channel carries information about the number of OFDM symbols used for transmission of PDCCHs in a subframe. The set of OFDM symbols possible to use for PDCCH in a subframe is given by Table 6.7-1.

Table 6.7-1 of 3GPP TS 36.211 V10.7.0, Entitled "Number of OFDM Symbols used for PDCCH", is Reproduced as FIG. 16

The PCFICH shall be transmitted when the number of OFDM symbols for PDCCH is greater than zero.

6.7.1 Scrambling

The block of bits b(0), . . . , b(31) transmitted in one subframe shall be scrambled with a cell-specific sequence prior to modulation, resulting in a block of scrambled bits $\tilde{b}(0), \ldots, \tilde{b}(31)$ according to $$\tilde{b}(i)=(b(i)+c(i)) \bmod 2$$

where the scrambling sequence c(i) is given by Section 7.2. The scrambling sequence generator shall be initialised with $c_{init}=(\lfloor n_s/2\rfloor+1)\cdot(2N_{ID}^{cell}+1)\cdot 2^9+N_{ID}^{cell}$ at the start of each subframe.

6.7.2 Modulation

The block of scrambled bits $\tilde{b}(0), \ldots, \tilde{b}(31)$ shall be modulated as described in Section 7.1, resulting in a block of complex-valued modulation symbols d(0), . . . , d(15). Table 6.7.2-1 specifies the modulation mappings applicable for the physical control format indicator channel.

Table 6.7.2-1 of 3GPP TS 36.211 V10.7.0, Entitled "PCFICH Modulation Schemes", is Reproduced as FIG. 17

6.7.3 Layer Mapping and Precoding

The block of modulation symbols d(0), . . . , d(15) shall be mapped to layers according to one of Sections 6.3.3.1 or 6.3.3.3 with $M_{symb}^{(0)}=16$ and precoded according to one of Sections 6.3.4.1 or 6.3.4.3, resulting in a block of vectors $y(i)=[y^{(0)}(i) \ldots y^{(P-1)}(i)]^T$, i=1, . . . ,15, where $y^{(p)}(i)$ represents the signal for antenna port p and where p=0, . . . , P−1 and the number of antenna ports for cell-specific reference signals P∈{1,2,4}. The PCFICH shall be transmitted on the same set of antenna ports as the PBCH.

6.7.4 Mapping to Resource Elements

The mapping to resource elements is defined in terms of quadruplets of complex-valued symbols. Let $z^{(p)}(i)=\langle y^{(p)}(4i), y^{(p)}(4i+1), y^{(p)}(4i+2), y^{(p)}(4i+3)\rangle$ denote symbol quadruplet i for antenna port p. For each of the antenna ports, symbol quadruplets shall be mapped in increasing order of i to the four resource-element groups in the first OFDM symbol in a downlink subframe with the representative resource-element as defined in Section 6.2.4 given by $z^{(p)}(0)$ is mapped to the resource-element group represented by $k=\bar{k}$ $z^{(p)}(1)$ is mapped to the resource-element group represented by $k=\bar{k}+\lfloor N_{RB}^{DL}/2\rfloor\cdot N_{SC}^{RB}/2$ $z^{(p)}(2)$ is mapped to the resource-element group represented by $k=\bar{k}+\lfloor 2N_{RB}^{DL}/2\rfloor\cdot N_{SC}^{RB}/2$ $z^{(p)}(3)$ is mapped to the resource-element group represented by $k=\bar{k}+\lfloor 3N_{RB}^{DL}/2\rfloor\cdot N_{SC}^{RB}/2$ where the additions are modulo $N_{RB}^{DL}N_{SC}^{RB}$, $$\bar{k}=(N_{SC}^{RB}/2)\cdot(N_{ID}^{cell} \bmod 2N_{RB}^{DL})$$

and $N_{ID}^{cell}$ is the physical-layer cell identity as given by Section 6.11.

6.10 Reference Signals

Five types of downlink reference signals are defined:
Cell-specific reference signals (CRS)
MBSFN reference signals
UE-specific reference signals (DM-RS)
Positioning reference signals (PRS)
CSI reference signals (CSI-RS)

There is one reference signal transmitted per downlink antenna port.

6.10.1 Cell-specific Reference Signals

Cell-specific reference signals shall be transmitted in all downlink subframes in a cell supporting PDSCH transmission.

Cell-specific reference signals are transmitted on one or several of antenna ports 0 to 3.

Cell-specific reference signals are defined for $\Delta f=15$ kHz only.

6.10.1.1 Sequence Generation

The reference-signal sequence $r_{l,n_s}(m)$ is defined by $$r_{l,n_s}(m) = \frac{1}{\sqrt{2}}(1-2 \cdot c(2m)) + j\frac{1}{\sqrt{2}}(1-2 \cdot c(2m+1)),$$
$$m = 0, 1, \ldots, 2N_{RB}^{max,DL} - 1$$

where $n_s$ is the slot number within a radio frame and l is the OFDM symbol number within the slot. The pseudo-random sequence c(i) is defined in Section 7.2. The pseudo-random sequence generator shall be initialised with $c_{init}=2^{10} \cdot (7 \cdot (n_s+1)+l+1) \cdot (2 \cdot N_{ID}^{cell}+1)+2 \cdot N_{ID}^{cell}+N_{CP}$ at the start of each OFDM symbol where $$N_{CP} = \begin{cases} 1 & \text{for normal } CP \\ 0 & \text{for extended } CP \end{cases}$$

6.10.1.2 Mapping to Resource Elements

The reference signal sequence $r_{l,n_s}(m)$ shall be mapped to complex-valued modulation symbols $a_{k,l}^{(p)}$ used as reference symbols for antenna port p in slot $n_s$ according to $$a_{k,l}^{(p)} = r_{l,n_s}(m')$$

where $$k = 6m + (v + v_{shift}) \bmod 6$$
$$l = \begin{cases} 0, N_{symb}^{DL} - 3 & \text{if } p \in \{0, 1\} \\ 1 & \text{if } p \in \{2, 3\} \end{cases}$$
$$m = 0, 1, \ldots, 2 \cdot N_{RB}^{DL} - 1$$
$$m' = m + N_{RB}^{max,DL} - N_{RB}^{DL}$$

The variables v and $v_{shift}$ define the position in the frequency domain for the different reference signals where v is given by $$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

The cell-specific frequency shift is given by $v_{shift} = N_{ID}^{cell} \bmod 6$.

Resource elements (k, l) used for transmission of cell-specific reference signals on any of the antenna ports in a slot shall not be used for any transmission on any other antenna port in the same slot and set to zero.

In an MBSFN subframe, cell-specific reference signals shall only be transmitted in the non-MBSFN region of the MBSFN subframe.

Figures 6.10.1.2-1 and 6.10.1.2-2 illustrate the resource elements used for reference signal transmission according to the above definition. The notation $R_p$ is used to denote a resource element used for reference signal transmission on antenna port p.

Figure 18:
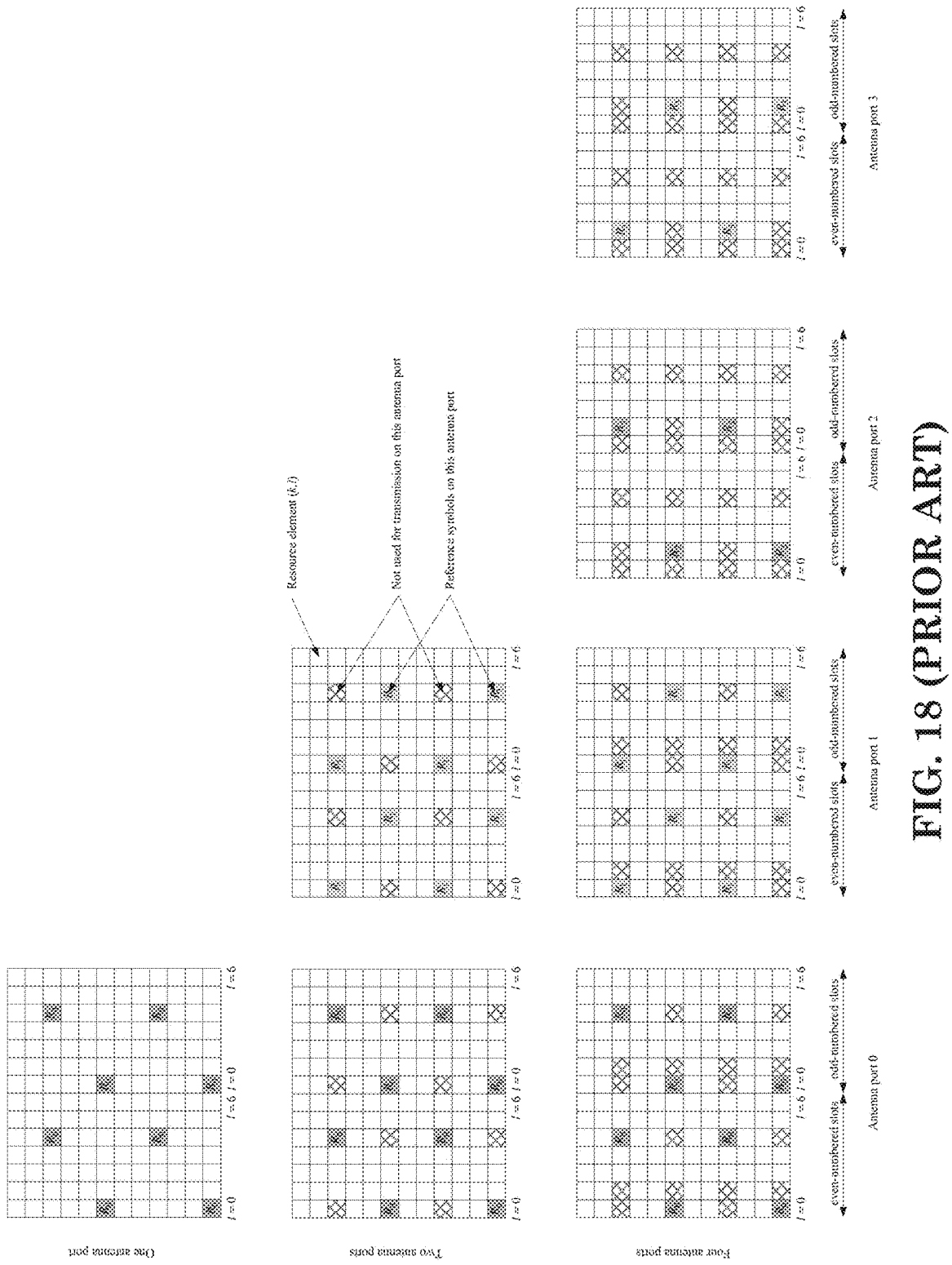
FIG. 18 is a reproduction of Figure 6.10.1.2-1 of 3GPP TS 36.211 V10.7.0.

Figure 6.10.1.2-1 of 3GPP TS 36.211 V10.7.0, Entitled "Mapping of Downlink Reference Signals (Normal Cyclic Prefix)", is Reproduced as FIG. 18

Figure 19:
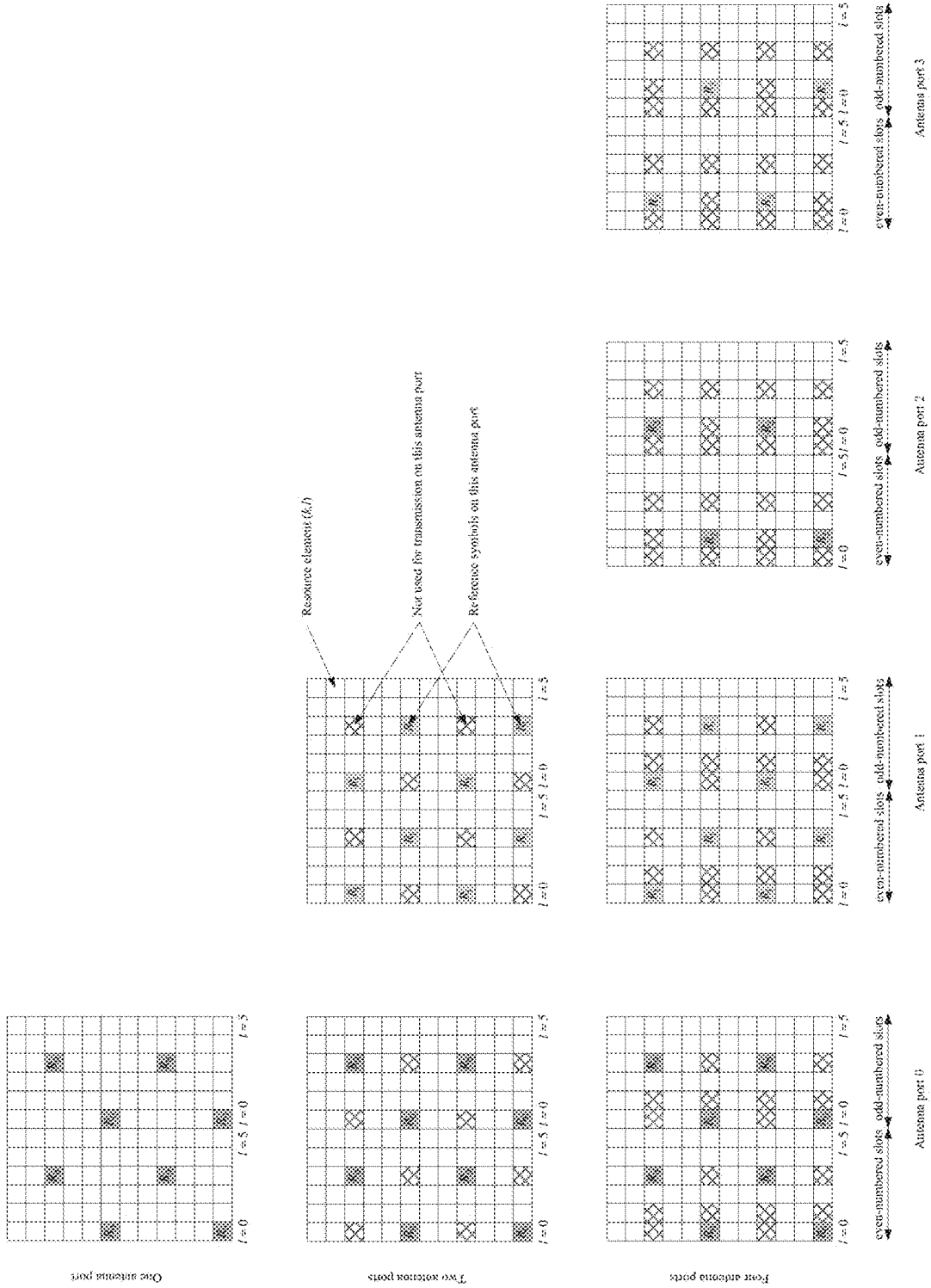
FIG. 19 is a reproduction of Figure 6.10.1.2-2 of 3GPP TS 36.211 V10.7.0.

Figure 6.10.1.2-2 of 3GPP TS 36.211 V10.7.0, entitled "Mapping of downlink reference signals (extended cyclic prefix)", is reproduced as FIG. 19

[ . . . ]

6.10.3 UE-specific Reference Signals

UE-specific reference signals are supported for transmission of PDSCH and are transmitted on antenna port(s) p=5, p=7, p=8 or p=7,8, . . . , v+6, where v is the number of layers used for transmission of the PDSCH. UE-specific reference signals are present and are a valid reference for PDSCH demodulation only if the PDSCH transmission is associated with the corresponding antenna port according to Section 7.1 of [4]. UE-specific reference signals are transmitted only on the resource blocks upon which the corresponding PDSCH is mapped. The UE-specific reference signal is not transmitted in resource elements (k, l) in which one of the physical channels or physical signals other than UE-specific reference signal defined in 6.1 are transmitted using resource elements with the same index pair (k, l) regardless of their antenna port p.

6.10.3.1 Sequence Generation

For antenna port 5, the UE-specific reference-signal sequence $r_{n_s}(m)$ is defined by $$r_{n_s}(m) = \frac{1}{\sqrt{2}}(1-2 \cdot c(2m)) + j\frac{1}{\sqrt{2}}(1-2 \cdot c(2m+1)),$$
$$m = 0, 1, \ldots, 12N_{RB}^{PDSCH} - 1$$

where $N_{RB}^{PDSCH}$ denotes the bandwidth in resource blocks of the corresponding PDSCH transmission. The pseudo-random sequence c(i) is defined in Section 7.2. The pseudo-random sequence generator shall be initialised with $c_{init}=(\lfloor n_s/2 \rfloor+1) \cdot (2N_{ID}^{cell}+1) \cdot 2^{16}+n_{RNTI}$ at the start of each subframe where $n_{RNTI}$ is as described in Section 7.1[4].

For any of the antenna ports $p \in \{7,8, \ldots, v+6\}$, the reference-signal sequence r(m) is defined by $$r(m) = \frac{1}{\sqrt{2}}(1-2 \cdot c(2m)) + j\frac{1}{\sqrt{2}}(1-2 \cdot c(2m+1)),$$
$$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases}.$$

The pseudo-random sequence c(i) is defined in Section 7.2. The pseudo-random sequence generator shall be initialised with $c_{init}=(\lfloor n_s/2 \rfloor+1) \cdot (2N_{ID}^{cell}+1) \cdot 2^{16}+n_{SCID}$ at the start of each subframe. The value of $n_{SCID}$ is zero unless specified otherwise. For a PDSCH transmission on ports 7 or 8, $n_{SCID}$ is given by the DCI format 2B or 2C [3] associated with the PDSCH transmission. In the case of DCI format 2B, $n_{SCID}$ is indicated by the scrambling identity field according to Table 6.10.3.1-1. In the case of DCI format 2C, $n_{SCID}$ is given by Table 5.3.3.1.5C-1 in [3].

[ . . . ]

6.10.3.2 Mapping to Resource Elements

For antenna port 5, in a physical resource block with frequency-domain index $n_{PRB}$ assigned for the corresponding PDSCH transmission, the reference signal sequence $r_{n_s}(m)$ shall be mapped to complex-valued modulation symbols $a_{k,l}^{(p)}$ with p=5 in a subframe according to:

Normal cyclic prefix:

$$a_{k,l}^{(p)} = r_{n_s}(3 \cdot l' \cdot N_{RB}^{PDSCH} + m')$$

$$k = (k') \bmod N_{sc}^{RB} + N_{sc}^{RB} \cdot n_{PRB}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

Extended cyclic prefix:

$$a_{k,l}^{(p)} = r_{n_s}(4 \cdot l' \cdot N_{RB}^{PDSCH} + m')$$

$$k = (k') \bmod N_{sc}^{RB} + N_{sc}^{RB} \cdot n_{PRB}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

where m' is the counter of UE-specific reference signal resource elements within a respective OFDM symbol of the PDSCH transmission.

The cell-specific frequency shift is given by $v_{shift} = N_{ID}^{cell}$ mod 3

The mapping shall be in increasing order of the frequency-domain index $n_{PRB}$ of the physical resource blocks assigned for the corresponding PDSCH transmission. The quantity $N_{RB}^{PDSCH}$ denotes the bandwidth in resource blocks of the corresponding PDSCH transmission.

Figure 6.10.3.2-1 illustrates the resource elements used for UE-specific reference signals for normal cyclic prefix for antenna port 5.

Figure 6.10.3.2-2 illustrates the resource elements used for UE-specific reference signals for extended cyclic prefix for antenna port 5.

The notation $R_p$ is used to denote a resource element used for reference signal transmission on antenna port p.

Figure 20:
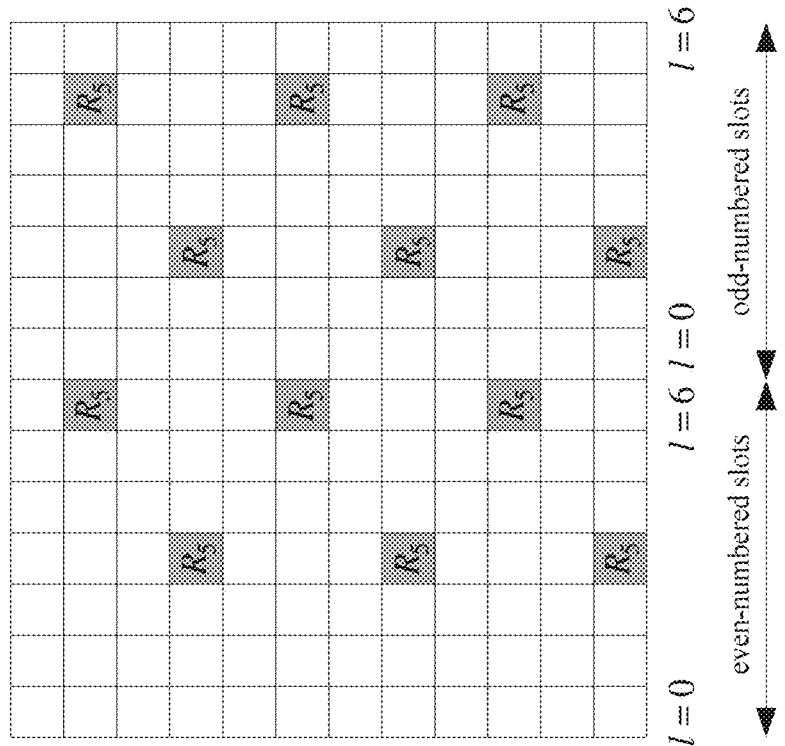
FIG. 20 is a reproduction of Figure 6.10.3.2-1 of 3GPP TS 36.211 V10.7.0.

Figure 6.10.3.2-1 of 3GPP TS 36.211 V10.7.0, Entitled "Mapping of UE-specific Reference Signals, Antenna Port 5 (Normal Cyclic Prefix)", is Reproduced as FIG. 20

Figure 21:
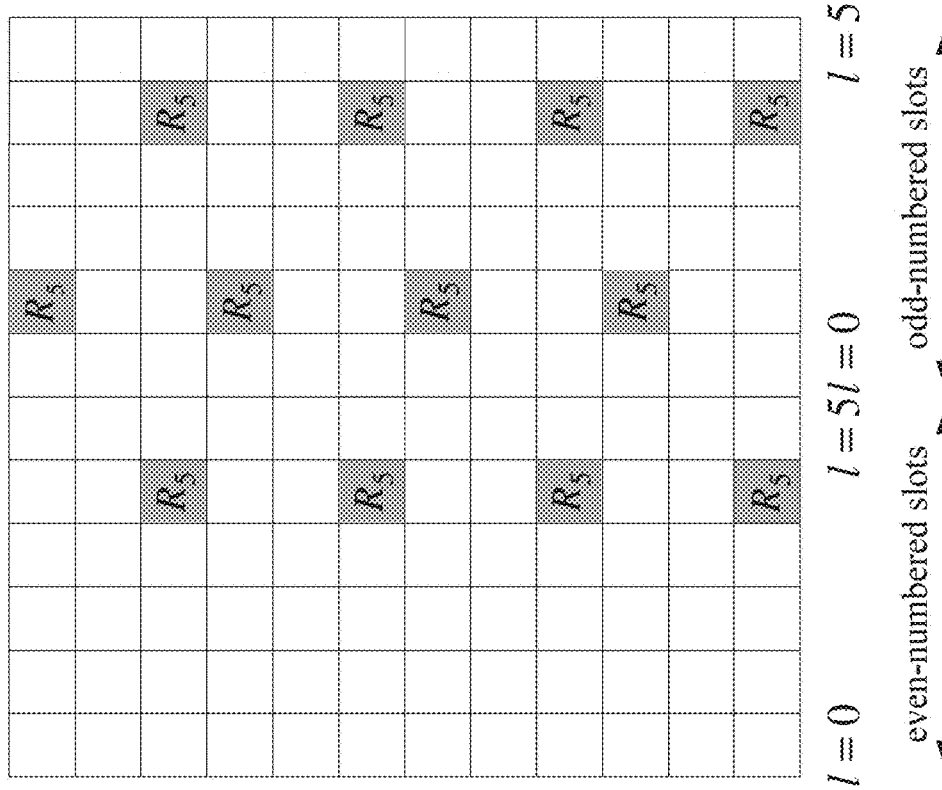
FIG. 21 is a reproduction of Figure 6.10.3.2-2 of 3GPP TS 36.211 V10.7.0.

Figure 6.10.3.2-2 of 3GPP TS 36.211 V10.7.0, Entitled "Mapping of UE-specific Reference Signals, Antenna Port 5 (Extended Cyclic Prefix)", is Reproduced as FIG. 21

For antenna ports p=7, p=8 or p=7,8, . . . , v+6, in a physical resource block with frequency-domain index $n_{PRB}$ assigned for the corresponding PDSCH transmission, a part of the reference signal sequence r(m) shall be mapped to complex-valued modulation symbols $a_{k,l}^{(p)}$ in a subframe according to Normal cyclic prefix:

$$a_{k,l}^{(p)} = w_p(l') \cdot r(3 \cdot l' \cdot N_{RB}^{max,DL} + 3 \cdot n_{PRB} + m')$$

where $$w_p(i) = \begin{cases} \bar{w}_p(i) & (m' + n_{PRB}) \bmod 2 = 0 \\ \bar{w}_p(3 - i) & (m' + n_{PRB}) \bmod 2 = 1 \end{cases}$$

$$k = 5m' + N_{sc}^{RB} n_{PRB} + k'$$

$$k' = \begin{cases} 1 & p \in \{7, 8, 11, 13\} \\ 0 & p \in \{9, 10, 12, 14\} \end{cases}$$

$$l = \begin{cases} l' \bmod 2 + 2 & \text{if in a special subframe with configuration 3, 4, or 8 (see Table 4.2-1)} \\ l' \bmod 2 + 2 + 3\lfloor l'/2 \rfloor & \text{if in a special subframe with configuration 1, 2, 6, or 7 (see Table 4.2-1)} \\ l' \bmod 2 + 5 & \text{if not in a special subframe} \end{cases}$$

$$l' = \begin{cases} 0, 1, 2, 3 & \text{if } n_s \bmod 2 = 0 \text{ and in a special subframe with configuration 1, 2, 6, or 7 (see Table 4.2-1)} \\ 0, 1 & \text{if } n_s \bmod 2 = 0 \text{ and not in special subframe with configuration 1, 2, 6, or 7 (see Table 4.2-1)} \\ 2, 3 & \text{if } n_s \bmod 2 = 1 \text{ and not in special subframe with configuration 1, 2, 6, or 7 (see Table 4.2-1)} \end{cases}$$

$$m' = 0, 1, 2$$

The sequence $\bar{w}_p(i)$ is given by Table 6.10.3.2-1.

[ . . . ]

Extended cyclic prefix:

$$a_{k,l}^{(p)} = w_p(l' \bmod 2) \cdot r(4 \cdot l' \cdot N_{RB}^{max,DL} + 4 \cdot n_{PRB} + m')$$

where $$w_p(i) = \begin{cases} \bar{w}_p(i) & m' \bmod 2 = 0 \\ \bar{w}_p(1 - i) & m' \bmod 2 = 1 \end{cases}$$

$$k = 3m' + N_{sc}^{RB} n_{PRB} + k'$$

$$k' = \begin{cases} 1 & \text{if } n_s \bmod 2 = 0 \text{ and } p \in \{7, 8\} \\ 2 & \text{if } n_s \bmod 2 = 1 \text{ and } p \in \{7, 8\} \end{cases}$$

$$l = l' \bmod 2 + 4$$

-continued $$l' = \begin{cases} 0,1 & \text{if } n_s\text{mod}2 = 0 \text{ and in a special subframe with configuration 1, 2, 3, 5 or 6 (see Table 4.2-1)} \\ 0,1 & \text{if } n_s\text{mod}2 = 0 \text{ and not in a special subframe} \\ 2,3 & \text{if } n_s\text{mod}2 = 1 \text{ and not in a special subframe} \end{cases}$$

$$m' = 0, 1, 2, 3$$

The sequence $\overline{w}_p(i)$ is given by Table 6.10.3.2-2.
[ . . . ]

For extended cyclic prefix, UE-specific reference signals are not supported on antenna ports 9 to 14.

Resource elements (k, l) used for transmission of UE-specific reference signals to one UE on any of the antenna ports in the set S, where S={7,8,11,13} or S={9,10,12,14} shall not be used for transmission of PDSCH on any antenna port in the same slot, and not be used for UE-specific reference signals to the same UE on any antenna port other than those in s in the same slot.

Figure 6.10.3.2-3 illustrates the resource elements used for UE-specific reference signals for normal cyclic prefix for antenna ports 7, 8, 9 and 10. Figure 6.10.3.2-4 illustrates the resource elements used for UE-specific reference signals for extended cyclic prefix for antenna ports 7, 8.

Latency reduction is generally an important feature discussed in 3GPP RAN1#85 Chairman's Notes. One way to reduce the latency is through shortening the TTI length and therefore, may result in shorter processing time and RTT. Furthermore, there are two possible short TTI lengths 2os, 7os for downlink and three 2os, 4os, 7os for uplink in FDD (Frequency Division Duplex) as discussed in 3GPP TR 38.881.

Based on the agreement discussed in in 3GPP TR 38.881, there are multiple TTI lengths in a subframe. Aim to two short TTI lengths in a downlink subframe, UEs, which are capable of short TTI, are signaled by some means in order to know the allocated band for the two short TTI lengths.

One possible solution is through RRC signaling. However, this method limits scheduling flexibility of network and be non-adaptive to present short traffic due to a long period. Another possible solution is signaled by DCI (Downlink Control Information) format which is monitored by other RNTI; and there are two DCIs indicating resource allocation for two short TTIs. Resource allocation is first through bit-mapping like the legacy LTE, and every bit within the resource allocation field maps to a resource band. However, this method causes larger signal overhead due to free scheduling and the resource allocation bits of bit-mapping are proportional to downlink bandwidth. For example, in LTE, the downlink system bandwidth is 100 physical resource blocks, the resource allocation bits is 25 bits, and each bit represents one resource band which consists of four physical resource blocks. It seems helpful to make another enhancement of the above method or take some limitation of the resource allocation. Furthermore, one way to reduce signal overhead is through taking contiguous resource allocation as a limitation.

In addition, the number of DCIs for short TTI is proportional to the number of possible short TTI configuration, which means that a two short TTI configuration would need two DCIs to indicate each resource allocation and control information. However, considering the fixed and limited size of common control search space, insufficient CCE number is a problem for short TTI. Hence, it is better to jointly consider the CCE cost in common search space and signaling overhead in DCI, and design a new signaling to indicate the resource allocation of the configured short TTI to a UE.

Solution: Signaling two short TTI band in a DCI format. In one embodiment, there are X shortened TTIs that have length shorter than one subframe. The value of X is more than one, and the TTI length within X TTIs could be the same. In one embodiment, the TTI length within X TTIs could be different, and the difference could be one-symbol.

In one embodiment, based on the assumption in 3GPP TR 38.881, there could be no shortened TTI spanning over subframe boundary. Furthermore, the shortened TTI may not cross the slot boundary. For example, if two-symbols TTI is configured, the most shortened TTIs would be two-symbols, while three-symbols TTI could be introduced to use the leftover symbol in each slot. In addition, there could be Y shortened TTIs with length that is shorter than or equal to one subframe. The value of Y could be more than or equal to one, and the TTI length within Y TTIs is the same.

In one embodiment, receiving control information by two-stage DCI could be considered for short TTI capable UEs to reduce signaling overhead. The first stage could receive a first DCI transmitted in a search space which is signaled by CFI (Control Format Indicator). The search space could be common search space or UE-specific search space. In addition, the second stage could receive a second DCI transmitted in every short TTI.

In one embodiment, short TTIs capable UEs could be configured with a new RNTI value. The RNTI value could be the same for the UEs. In addition, the downlink control information could be scrambled with the RNTI value. Furthermore, the UEs could use the RNTI to monitor the first DCI. Also, the UEs could use the RNTI to descramble the first DCI.

In one embodiment, a first UE is configured with TTI(s) shorter than one subframe. There could be X TTIs in one subframe. As an example, the UE could be configured by RRC to operate within two-symbols TTI or three-symbols TTI. Furthermore, the UE could receive a first DCI for short TTI transmitted in a search space signaled by CFI. In addition, the first DCI could indicate common control information for short capable UEs. Also, the first DCI could be scrambled with the RNTI mentioned above. The payload size of the first DCI could be the same as the DCI format in common search space.

In one embodiment, the resource allocation field in the first DCI indicates resource allocation for first resources and second resources. The first resources could be for the TTI(s) which are within X TTIs, and the second resources could be for the TTI which is within Y TTIs. Furthermore, the common control information could include two transmit power commands fields for the two resources. In addition, the common control information could include two modulation and coding scheme fields for the two resources.

In one embodiment, the resource allocation bits could be converted into a decimal number which is unique and represents an unique combination of resource allocation for two contiguous resource ranges. In one embodiment, the decimal number could be converted into four different indexes. Furthermore, among the four different indexes, two lowest indexes of the four different indexes could indicate a first contiguous resource range. In addition, the first contiguous resource range could be allocated from the lowest index to the second lowest index minus one. Also, among the four different indexes, two highest indexes of the four different indexes could indicate a second contiguous resource range. In addition, the second contiguous resource range could be allocated from the second highest index to the highest index minus one.

In one embodiment, resources within the first contiguous resource range could be allocated as the first resources; and resources within the second contiguous resource range could be allocated as the second resources. Alternatively, resources within the first contiguous resource range could be allocated as the second resources; and resources within the second contiguous resource range could be allocated as the first resources.

In one embodiment, there could be a bit in DCI to indicate mapping relationship between resources and the contiguous resource ranges. For example, if value of the bit is zero, the first contiguous resource range is allocated to the first resources, and the second contiguous resource range is allocated to the second resources. If value of the bit is one, the first contiguous resource range is allocated to the second resources, and the second contiguous resource range is allocated to the first resources.

In one embodiment, the first contiguous resource range could be allocated to the first resources, and the second contiguous resource range could be allocated to the second resources. Alternatively, the first contiguous resource range could be allocated to the second resources, and the second contiguous resource range could be allocated to the first resources.

In one embodiment, the first resources could be allocated to lower frequency PRB(s) and the second resources could be allocated to higher frequency PRB(s). Alternatively, the first resources could be allocated to higher frequency PRB(s), and the second resources could be allocated to lower frequency PRB(s).

In one embodiment, network signaling could be used to determine which contiguous resource range is allocated for the first resources and which contiguous resource range is allocated for the second resources. In one embodiment, in a first subframe, a UE could receive a DCI which indicates resource allocation for the first resources and the second resources, wherein there are X TTIs in the first resources and there are Y TTIs in the second resources. Furthermore, the UE could receive downlink data within the first resources which is indicated by the DCI. In addition, the UE could not receive downlink data within the second resources.

In one embodiment, in a second subframe, the UE could receive a DCI which indicates resource allocation for the first resources and the second resources, wherein there are X TTIs in the first resources and there are Y TTIs in the second resources. In addition, the UE could receive downlink data within the second resources which is indicated by the DCI. In addition, the UE could not receive downlink data within the first resources.

In one embodiment, broadcast signaling could be used to determine which contiguous resource range is allocated for the first resources and which contiguous resource range is allocated for the second resources. In one embodiment, the decimal number could be the sum of extended binomial coefficient of the four indexes. For example, the extended binomial coefficient could be $$\begin{Bmatrix} x \\ y \end{Bmatrix} = \begin{cases} \begin{pmatrix} x \\ y \end{pmatrix} & x \geq y \\ 0 & x < y \end{cases}.$$

Furthermore, in LTE, there are mainly two reference signal pattern for channel estimation. One reference signal is Common Reference Signal (CRS) which means that it is common for UEs in the cell. The other reference signal is Demodulation Reference Signal (DMRS) which is dedicated to a specific UE.

In the case of introducing the feature of TTI shortening, there is no change for CRS definition in TTI shortening discussed in 3GPP TR 38.881. However, for DMRS, the tradeoff between estimation performance and signaling overhead needs to be design in a new way.

Furthermore, both DMRS PDCCH for short TTI and DMRS for short PDSCH are suggested for supporting as discussed in 3GPP TR 38.881. However, in a two symbol length TTI, channel response in the same band may not change dramatically between the two adjacent symbols. Hence, it would be unwise to allocate DMRS on two adjacent symbols in same shortened TTI; and it would be proper to make other methods for allocating DMRS supporting PDCCH and PDSCH within a shortened TTI that is shorter than one slot.

It would be generally better to assign control channels in the first few symbols and to follow by with data channels within one TTI. For shortened TTIs, the above concept is no exception. However, resource elements in shortened TTI are fewer than in legacy TTI. The resource utilization aspect is extensively discussed in RAN1#85 Chairman's Notes. The conclusion is that within shortened TTI, sPDSCH assigned by a sPDCCH could be mapped to resources which are left unused by any sPDCCH. In other words, there are OFDM symbols consisted of resource elements for sPDCCH and sPDSCH.

In the context of the two-symbols TTI, the first symbol could include sPDCCH and sPDSCH, and the second symbol could be for sPDSCH. However, if a short TTI capable UE configured TM mode which needs DMRS for sPDCCH and sPDSCH and if the sPDSCH allocated to the UE is on the same band of the two-symbols TTI, there needs to be a method to reduce the DMRS overhead of overlapping band.

In one embodiment, two-stage DCI is considered for short TTI capable UEs in order to reduce signaling overhead. The first stage could receive downlink control information transmitted in a search space which is signaled by CFI. The search space could be common search space or UE-specific search space. Furthermore, the second stage could receive DCI transmitted in every short TTI which is called sPDCCH.

In one embodiment, within one shortened TTI, there could be a first few symbols for short control channels followed by short data channels. The resource allocation of a short data channel transmitted for a UE could be based on a control channel transmitted in first stage or based on a corresponding short control channel. Furthermore, channel response in a wireless communication environment does not change dramatically within one or two OFDM symbols.

In one embodiment, DMRS for sPDCCH could be allocated on the first symbol within a shortened TTI. Furthermore, consider slot-based TTI, resource elements are more sufficient than two-symbols TTI. It is generally better to have a DMRS for sPDCCH and another DMRS for sPDSCH. In addition, consider two-symbols TTI and three-symbols TTI, different DMRSs for a sPDCCH and a sPDSCH are needed in the case where the sPDSCH is allocated in resource location which is different from the corresponding sPDCCH.

In one embodiment, within a shortened TTI, in the case where frequency resource location of a second resource set has partly the same as a first resource set, DMRS for the same frequency resource location of the second resource sets could be omitted. Preferably, within the shortened TTI, the first resource sets is on the first symbol and the second resource sets is on the following symbol(s).

In one embodiment, within a shortened TTI, in the case where sPDSCH transmitted on following symbol(s) with partly the same frequency resource location with sPDCCH or sPDCCH transmitted on the first symbol of the shortened TTI, DMRS of the same frequency part of the sPDSCH transmitted on the following symbol(s) could be omitted. In one embodiment, DMRS at the above same frequency location could be placed on the first symbol. Furthermore, the UE could use DMRS of the sPDCCH for estimating channel response and demodulating. In addition, for the same frequency location, the UE could use the estimated result of the DMRS in the sPDCCH to understand channel response and to demodulate the sPDSCH transmitted on the same frequency location.

In one embodiment, the UE could receive a sPDCCH and a corresponding sPDSCH within the shortened TTI where the sPDSCH is allocated to two resource parts. The first resource part could be in the first symbol and allocated on the resources left by unused sPDCCH. The second resource part could be in the following symbol(s).

In the case where the first resource part and the second resource part are partly located at a same frequency location, DMRS for the second resource part of sPDSCH which is located at the frequency location are not placed. Furthermore, the UE could use the DMRS of the first resource part of sPDSCH for estimating channel response and demodulating. For the same frequency location, the UE could use the estimating result of the DMRS in the first resource part of sPDSCH to understand channel response and to demodulate the second resource part of sPDSCH transmitted on the same frequency location.

In one embodiment, within a shortened TTI, a network could transmit a control information and a corresponding data information to a dedicated UE using same beamforming weight for the control information and the data information.

Figure 22:
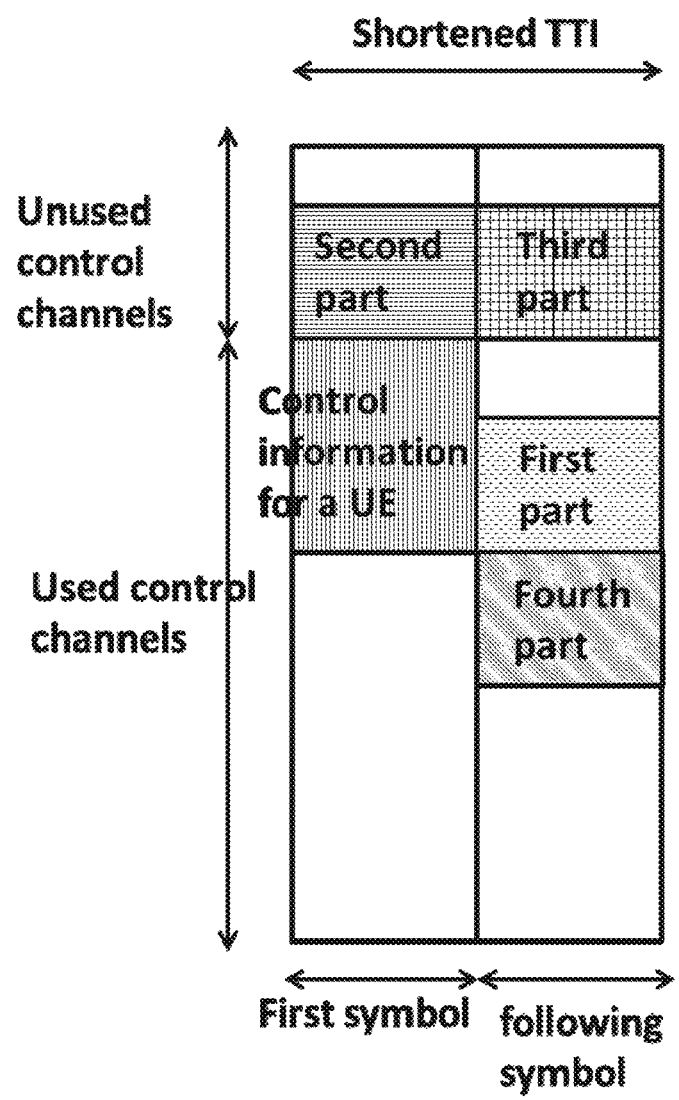
FIG. 22 is a diagram according to one exemplary embodiment.

FIG. 22 is a diagram according to one exemplary embodiment. As shown in FIG. 22, a UE could receive a control information and a corresponding data information transmitted within a shortened TTI. Resource allocation of the corresponding data information comprises at least one of four parts.

Figure 23:
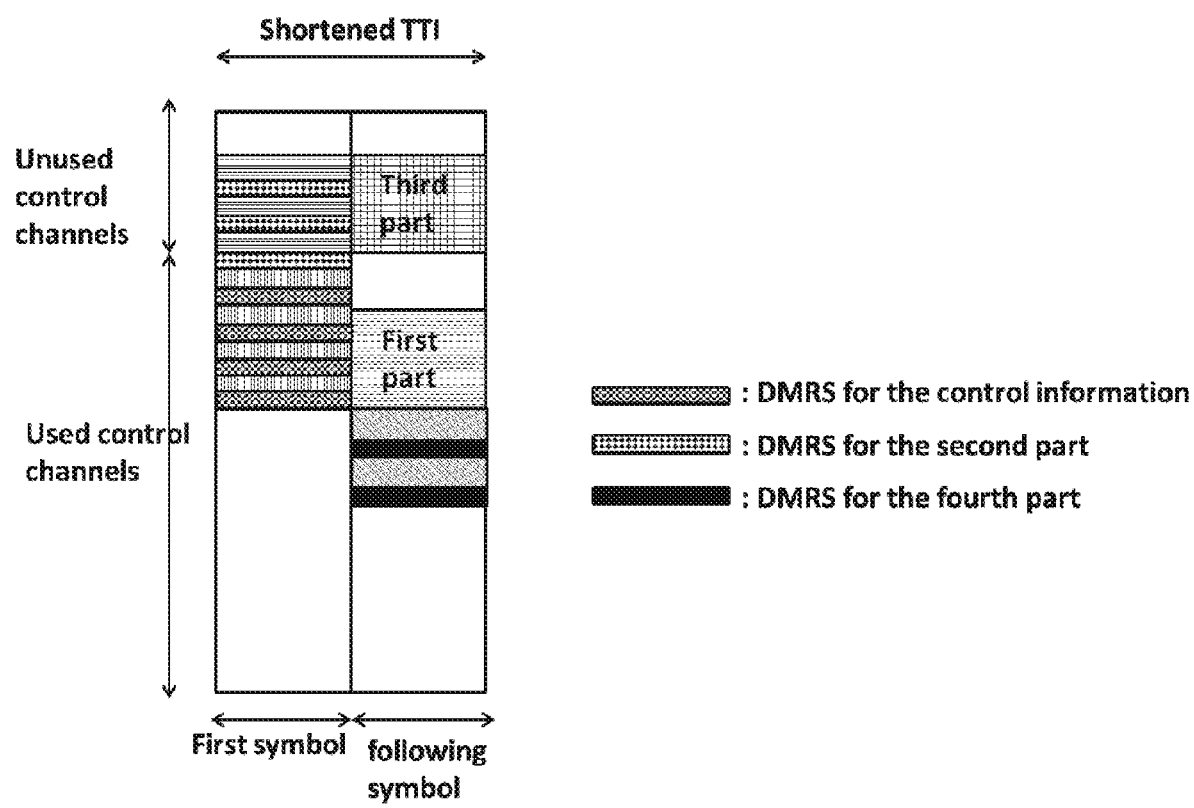
FIG. 23 is a diagram according to one exemplary embodiment.

FIG. 23 is a diagram according to one exemplary embodiment. FIG. 23 shows a DMRS for the control information, a DMRS for the second part of the data information, and a DMRS for the fourth part of the data information.

Figure 24:
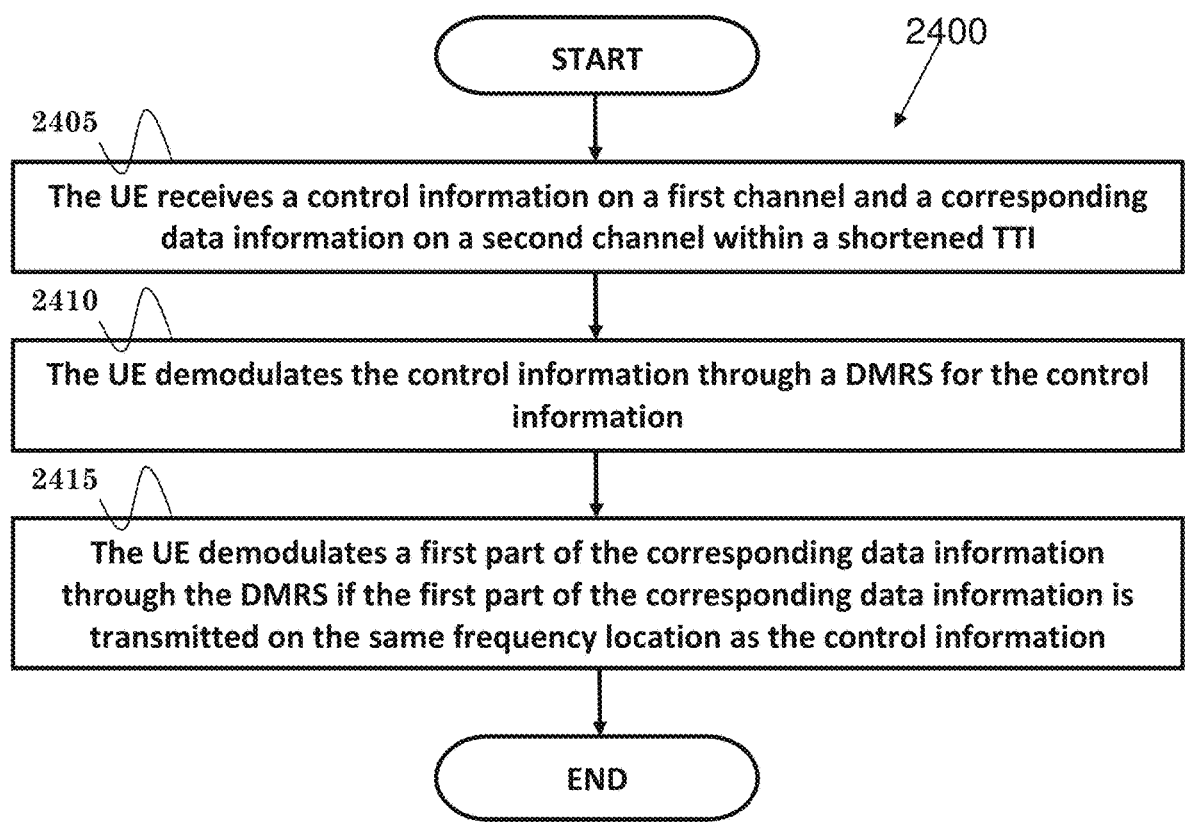
FIG. 24 is a flow chart according to one exemplary embodiment.

FIG. 24 is a flow chart 2400 according to one exemplary embodiment from the perspective of a UE. In step 2405, the UE receives a control information on a first channel and a corresponding data information on a second channel within a shortened TTI. In one embodiment, the control information is transmitted on a first symbol within the shortened TTI. In step 2410, the UE demodulates the control information through a DMRS for the control information. In step 2415, the UE demodulates a first part of the corresponding data information through the DMRS if the first part of the corresponding data information is transmitted on the same frequency location as the control information.

In one embodiment, the UE may not demodulate a part of the data information through the DMRS for the control information if the part of the data information is transmitted on different frequency location compared to the control information. Furthermore, the UE could demodulate a second part of the data information through a DMRS for the second part of the data information if the second part of the data information is transmitted on the first symbol within the shortened TTI, wherein resource allocation of the second part of the data is on resources left by unused control channels. Also, the UE could demodulate a third part of the data information through DMRS for the second part of the data information if resource allocation of the data information comprises the second part and the third part of the data information is transmitted on the same frequency location as the second part. In addition, the UE could demodulate a fourth part of the data information through a DMRS for the fourth part if the fourth part of the data information is transmitted on different frequency location compared to the control information and the second part of the data information if resource allocation of the data information comprises at least the second part. The UE could also demodulate a fourth part of the data information through a DMRS for the fourth part if the fourth part of the data information is transmitted on different frequency location compared to the control information and if resource allocation of the data information doesn't comprise the second part.

In one embodiment, resource allocation of the data information could include at least one of four part of the data information. Furthermore, the frequency location of the data information could be indicated through the resource allocation field in the control information, through the control information transmitted on control region which is indicated by CFI and in the same subframe as the shortened TTI, or through the resource allocation field in control information transmitted on control region which is indicated by CFI in the same subframe as the shortened TTI.

In one embodiment, the frequency location of the data information could be indicated through RRC signaling or through broadcasting signaling. Furthermore, among DMRS-based control channels, the frequency location of DMRS for the control channels is cell-specific to UEs in a cell.

In one embodiment, the resource allocation of the data information could be completely located at the same frequency location as the control information. The resource allocation of the data information could also include at least the first part of the data information. Furthermore, the data information could be completely located at different frequency locations compared to the control information.

In one embodiment, the UE could be configured with TTI(s) shorter than one subframe, wherein there are X TTIs in one subframe and the value X could be greater than one. Among X TTIs, the TTI length could be the same. Alternatively, among X TTIs, the TTI length could be different, wherein the difference of two TTI length is one.

In one embodiment, there could be two TTI lengths among X TTIs where one is two-symbols and the other is three-symbols. Furthermore, the shortened TTI could be within X TTIs. In addition, the length of the shortened TTI could be two-symbols or three-symbols.

Referring back to FIGS. 3 and 4, in one exemplary embodiment of a UE, the device 300 includes a program code 312 stored in the memory 310. The CPU 308 could execute program code 312 (i) to receive a control information on a first channel and a corresponding data information on a second channel within a shortened TTI, (ii) to demodulate the control information through a DMRS for the control information, and (iii) to demodulate a first part of the corresponding data information through the DMRS if the first part of the corresponding data information is transmitted on the same frequency location as the control information. Furthermore, the CPU 308 can execute the program code 312 to perform all of the above-described actions and steps or others described herein.

Figure 25:
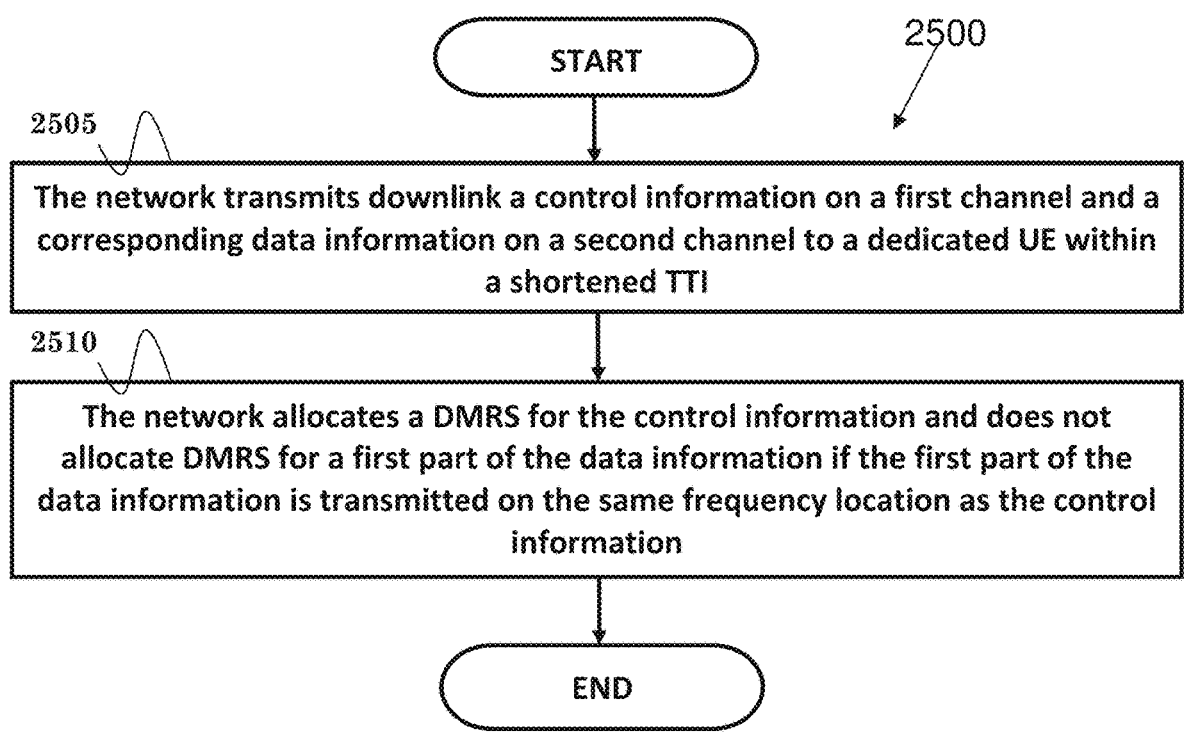
FIG. 25 is a flow chart according to one exemplary embodiment.

FIG. 25 is a flow chart 2500 according to one exemplary embodiment from the perspective of a network. In step 2505, the network transmits a downlink control information on a first channel and a corresponding data information on a second channel to a dedicated UE within a shortened TTI. In one embodiment, the control information is transmitted on a first symbol within the shortened TTI. In step 2510, the network allocates a DMRS for the control information and does not allocate DMRS for a first part of the data information if the first part of the data information is transmitted on the same frequency location as the control information.

In one embodiment, the network could allocates a DMRS for a second part of the data information if the second part of the data information is transmitted on the first symbol within the shortened TTI, wherein resource allocation of the second part of the data is on resources left by unused control channels. Furthermore, the network may not allocate DMRS for a third part of the data information if resource allocation of the data information comprises the second part and the third part of the data information is transmitted on the same frequency location as the second part. The network could also allocate a DMRS for a fourth part of the data information if the fourth part of the data information is transmitted on different frequency location compared to the control information and the second part of the data information if resource allocation of the data information comprises at least the second part. In addition, the network could allocate a DMRS for a fourth part of the data information if the fourth part of the data information is transmitted on different frequency location compared to the control information and if resource allocation of the data information does not comprise the second part.

In one embodiment, the resource allocation of the data information could include at least one of four part of the data information.

In one embodiment, the network could indicate to the dedicated UE the frequency location of the data information (i) through the resource allocation field in the control information, (ii) through control information transmitted on control region which is indicated by CFI and in the same subframe as the shortened TTI, (iii) through the resource allocation field in control information transmitted on control region which is indicated by CFI and in the same subframe as the shortened TTI, (iv) through RRC signaling, or (v) through broadcasting signaling. In one embodiment, among DMRS-based control channels, frequency location of DMRS for the control channels is cell-specific to UEs in a cell.

In one embodiment, the data information could be completely located at the same frequency location as the control information. Furthermore, the resource allocation of the data information could include at least the first part of the data information. In addition, the data information could be completely located at different frequency location compared to the control information.

In one embodiment, the network could configure the UE with TTI(s) shorter than one subframe, wherein there could be X TTIs in one subframe and the value X could be more than one. In one embodiment, the TTI length could be the same among X TTIs. Alternatively, the TTI length could be different among X TTIs, wherein the difference of two TTI length is one. For example, there could be two TTI lengths among X TTIs, where one could be two-symbols and the other could be three-symbols.

In one embodiment, the network could allocate the same beamforming weights for the control information and the data information transmitted on same frequency location as the control information. Alternatively, the network could allocate different beamforming weights for the control information and the data information transmitted on frequency location which is different from the control information. The network could also allocate the same beamforming weights for the data information transmitted on the same frequency location of different symbol(s) within the shortened TTI.

Referring back to FIGS. 3 and 4, in one exemplary embodiment of a network, the device 300 includes a program code 312 stored in the memory 310. The CPU 308 could execute program code 312 (i) to transmit downlink a control information on a first channel and a corresponding data information on a second channel to a dedicated UE within a shortened TTI, and (ii) to allocate a DMRS for the control information and does not allocate DMRS for a first part of the data information if the first part of the data information is transmitted on the same frequency location as the control information. Furthermore, the CPU 308 can execute the program code 312 to perform all of the above-described actions and steps or others described herein.

Figure 26:
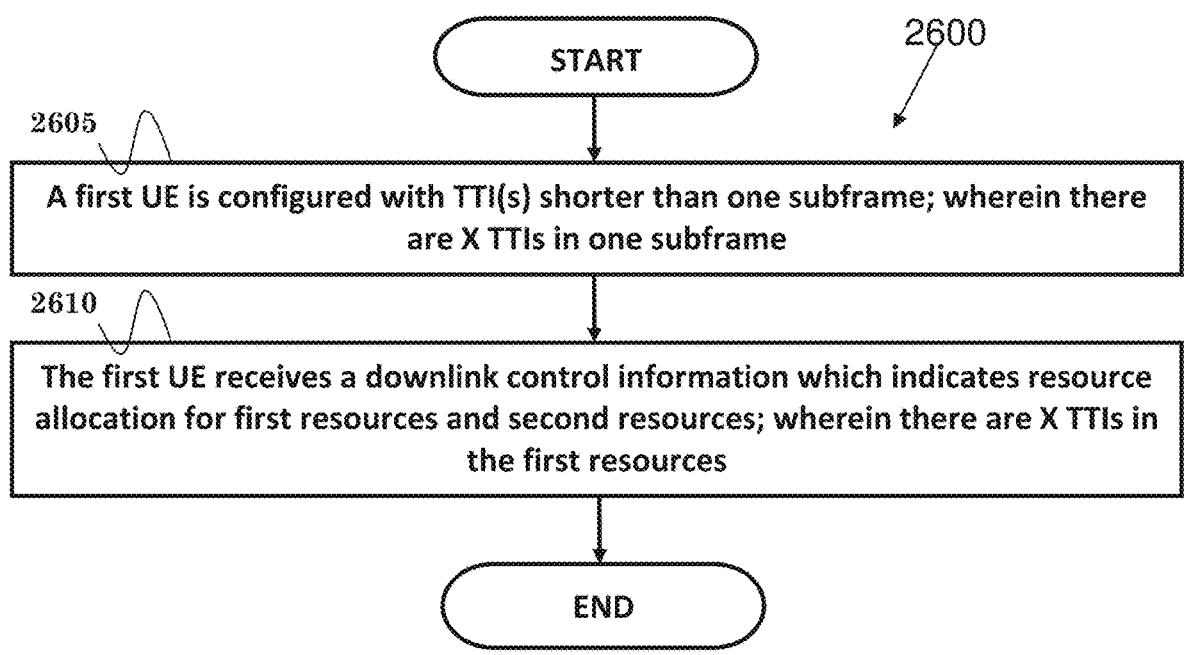
FIG. 26 is a flow chart according to one exemplary embodiment.

FIG. 26 is a flow chart 2600 according to one exemplary embodiment from the perspective of a first UE. In step 2605, a first UE is configured with TTI(s) shorter than one subframe; wherein there are X TTIs in one subframe. In step 2610, the first UE receives a downlink control information which indicates resource allocation for first resources and second resources; wherein there are X TTIs in the first resources. In one embodiment, the first UE could receive downlink data within the first resources, and does not receive downlink data within the second resources.

In one embodiment, a second UE is configured with a TTI which is shorter than one subframe; wherein there are Y TTIs in one subframe. The UE could receive the downlink control information which indicates resource allocation for the first resources and the second resources; wherein there are X TTIs in the first resources and there are Y TTIs in the second resources. In one embodiment, the second UE could receive downlink data within the second resources, and may not receive downlink data within the first resources.

In one embodiment, X and Y are integers greater than one. Furthermore, the TTI length could be the same among X TTIs. Alternatively, the TTI length could be different among X TTIs, wherein the difference of two TTI length is one. For example, there could be two TTI length among X TTIs, where one is two-symbols and the other is three-symbols.

In one embodiment, the downlink control information could indicate common control information for the first resources and the second resources. Furthermore, the downlink control information could be transmitted on the control region indicated by CFI or on the common search space.

In one embodiment, payload size of the downlink control information could be the same as the DCI format size in common search space. In one embodiment, the first UE and the second UE could be configured by a RNTI value, wherein the RNTI value could be used to monitor the downlink control information.

In one embodiment, the second UE could be configured with the RNTI value. Furthermore, the second UE could use the RNTI value to monitor the downlink control information.

In one embodiment, the downlink control information could include two groups of common control information, where one group is for the first resources and the other group is for the second resources. Furthermore, the resource allocation field in the downlink control information could be converted into a decimal number which represents an unique combination of resource allocation for the first resources and the second resources. In one embodiment, the decimal number is sum of extended binomial coefficient of the four indexes. The resource allocation field in the downlink control information could also indicate two contiguous resource ranges, where one range is for the first resources and the other range is for the second resources.

In one embodiment, the decimal number could be converted into four different indexes. The decimal number could be sum of extended binomial coefficient of the four indexes. In one embodiment, two lowest indexes of the four indexes could indicate a first contiguous resource range, while two highest indexes of the four indexes could indicate a second contiguous resource range. The first contiguous resource range could be allocated from the lowest index to the second lowest index minus one. The second contiguous resource range could be allocated from the second highest index to the highest index minus one.

In one embodiment, there could be a bit in the downlink control information indicating mapping relationship between the resources and the contiguous resource ranges, such that if the value of the bit is zero, the first contiguous resource range is allocated to the first resources and the second contiguous resource range is allocated to the second resources. Furthermore, if the value of the bit is one, the first contiguous resource range is allocated to the second resources and the second contiguous resource range is allocated to the first resources.

In one embodiment, the first contiguous resource range could be allocated to the first resources, and the second contiguous resource range could be allocated to the second resources. Alternatively, the first contiguous resource range could be allocated to the second resources, and the second contiguous resource range could be allocated to the first resources.

In one embodiment, the first resources could be allocated to lower frequency PRB(s), and the second resources are allocated to higher frequency PRB(s). Alternatively, the first resources could be allocated to higher frequency PRB(s), and the second resources could be allocated to lower frequency PRB(s).

In one embodiment, the contiguous resource ranges allocated for the first resources and the second resources could be determined based on network signaling or on broadcast signaling.

Referring back to FIGS. 3 and 4, in one exemplary embodiment of a first UE, the device 300 includes a program code 312 stored in the memory 310. The CPU 308 could execute program code 312 to enable the first UE (i) to be configured with TTI(s) shorter than one subframe; wherein there are X TTIs in one subframe, and (ii) to receive a downlink control information which indicates resource allocation for first resources and second resources; wherein there are X TTIs in the first resources. Furthermore, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a first UE (User Equipment), comprising:
   the first UE is configured with TTI(s) (Transmission Time Interval) shorter than one subframe, wherein there are X TTIs in one subframe and X is an integer larger than one;
   the first UE receives a DCI (Downlink Control Information) which indicates resource allocation for first resources and second resources, wherein there are X TTIs in the first resources and there are Y TTIs in the second resources, and wherein Y is an integer larger than one and is different than X.

2. The method of claim 1, further comprising:
   a second UE is configured with a TTI shorter than one subframe, wherein there are Y TTIs in one subframe;
   the second UE receives the downlink control information which indicates resource allocation for the first resources and the second resources, wherein there are X TTIs in the first resources and there are Y TTIs in the second resources.

3. The method of claim 2, wherein the first UE and the second UE configured by a RNTI (Radio Network Temporary Identifier) value, wherein the RNTI value is used to monitor the downlink control information.

4. The method of claim 1, further comprising:
   the first UE receives downlink data within the first resources, and does not receive downlink data within the second resources.

5. The method of claim 2, further comprising:
   the second UE receives downlink data within the second resources, and does not receive downlink data within the first resources.

6. The method of claim 1, wherein the downlink control information indicates common control information for the first resources and the second resources.

7. The method of claim 1, wherein the downlink control information is transmitted on the control region indicated by CFI (Control Format Indicator) or on the common search space.

8. The method of claim 1, wherein payload size of the downlink control information is the same as DCI (Downlink Control Information) format size in common search space.

9. The method of claim 1, wherein the resource allocation field in the downlink control information is converted into a decimal number which represents an unique combination of resource allocation for the first resources and the second resources.

10. The method of claim 9, wherein the decimal number is sum of extended binomial coefficient of the four indexes.

11. The method of claim 1, wherein the first resources are allocated to lower frequency PRB(s) (Physical Resource Block) and the second resources are allocated to higher frequency PRB(s).

12. A first User Equipment (UE), comprising:
    a control circuit;
    a processor installed in the control circuit; and
    a memory installed in the control circuit and operatively coupled to the processor;
    wherein the processor is configured to execute a program code stored in the memory to:
      enable the first UE to be configured with TTI(s) (Transmission Time Interval) shorter than one subframe, wherein there are X TTIs in one subframe and X is an integer larger than one;
      receive a DCI (Downlink Control Information) which indicates resource allocation for first resources and second resources, wherein there are X TTIs in the first resources and there are Y TTIs in the second resources, and wherein Y is an integer larger than one and is different from X.

13. The first UE of claim 12, wherein the processor is configured to execute a program code stored in the memory to:
    receive downlink data within the first resources, and does not receive downlink data within the second resources.

14. The first UE of claim 12, wherein the downlink control information indicates common control information for the first resources and the second resources.

15. The first UE of claim 12, wherein the downlink control information is transmitted on the control region indicated by CFI (Control Format Indicator) or on the common search space.

16. The first UE of claim 12, wherein payload size of the downlink control information is the same as DCI (Download Control Information) format size in common search space.

17. The first UE of claim 12, wherein the first UE and a second UE configured by a RNTI (Radio Network Temporary Identifier) value, wherein the RNTI value is used to monitor the downlink control information.

18. The first UE of claim 12, wherein the resource allocation field in the downlink control information is converted into a decimal number which represents an unique combination of resource allocation for the first resources and the second resources.

19. The first UE of claim 18, wherein the decimal number is sum of extended binomial coefficient of the four indexes.

20. The first UE of claim 12, wherein the first resources are allocated to lower frequency PRB(s) (Physical Resource Block) and the second resources are allocated to higher frequency PRB(s).

* * * * *